United States Patent
Notman et al.

(10) Patent No.: US 8,541,993 B2
(45) Date of Patent: Sep. 24, 2013

(54) DC-DC CONVERTERS OPERABLE IN A DISCONTINUOUS SWITCHING MODE

(75) Inventors: Andrew Notman, Edinburgh (GB); Mark McCloy-Stevens, Edinburgh (GB); Douglas James Wallace MacFarlane, Edinburgh (GB); Holger Haiplik, Swindon (GB)

(73) Assignee: Wolfson Microelectronics plc, Edinburgh (GB)

( * ) Notice: Subject to any disclaimer, the term of this patent is extended or adjusted under 35 U.S.C. 154(b) by 348 days.

(21) Appl. No.: 12/841,722

(22) Filed: Jul. 22, 2010

(65) Prior Publication Data

US 2011/0050185 A1    Mar. 3, 2011

Related U.S. Application Data

(60) Provisional application No. 61/228,002, filed on Jul. 23, 2009, provisional application No. 61/261,642, filed on Nov. 16, 2009.

(30) Foreign Application Priority Data

Jul. 22, 2009 (GB) .................................. 0912745.7
Oct. 27, 2009 (GB) .................................. 0918784.0

(51) Int. Cl.
  *G05F 1/565* (2006.01)
  *G05F 1/595* (2006.01)
(52) U.S. Cl.
  USPC ............ 323/271; 323/285; 323/287; 323/288
(58) Field of Classification Search
  USPC ................... 323/271, 282, 284–288
  See application file for complete search history.

(56) References Cited

U.S. PATENT DOCUMENTS

| 6,166,528 | A  | * | 12/2000 | Rossetti et al. | 323/283 |
| 6,377,032 | B1 | * | 4/2002  | Andruzzi et al. | 323/224 |
| 6,381,159 | B2 | * | 4/2002  | Oknaian et al.  | 363/98  |
| 6,930,474 | B2 | * | 8/2005  | Wang            | 323/288 |
| 7,135,841 | B1 |   | 11/2006 | Tomiyoshi et al. |        |
| 7,250,746 | B2 | * | 7/2007  | Oswald et al.   | 323/284 |
| 7,372,238 | B1 |   | 5/2008  | Tomiyoshi       |         |
| 7,615,981 | B2 | * | 11/2009 | Wong et al.     | 323/285 |
| 2003/0222688 | A1 |  | 12/2003 | Premont et al. |         |
| 2004/0169979 | A1 |  | 9/2004  | Pai            |         |
| 2004/0207372 | A1 |  | 10/2004 | Yoshikawa      |         |
| 2006/0017421 | A1 | * | 1/2006 | Solie et al.   | 323/225 |
| 2006/0145675 | A1 | * | 7/2006 | Lee et al.     | 323/282 |
| 2006/0214647 | A1 |  | 9/2006  | Ishimaru et al. |        |

(Continued)

*Primary Examiner* — Adolf Berhane
*Assistant Examiner* — Fred E Finch, III
(74) *Attorney, Agent, or Firm* — Dickstein Shapiro LLP

(57) ABSTRACT

Methods and apparatus for control of DC-DC converters, especially in valley current mode. The DC-DC converter is operable so that a low side supply switch may be turned off, before the high side supply switch is turned on. During the period when both switches are off the current loop control remains active and the change in inductor (L) current is emulated. One embodiment uses a current sensor for lossless current sensing and emulates the change in inductor current by holding the value of the output of the current sensor (ISNS) at the time that the low side switch turns off and adding an emulated ramp signal (VISLP) until the inductor current reaches zero. Embodiment employing a pulse-skip mode of operation based on a minimum conduction time are also disclosed. The invention enables a seamless transition from Continuous Conduction Mode the Discontinuous Conduction Mode and Pulse Skipping and provide converters that are efficient at low current loads.

25 Claims, 16 Drawing Sheets

(56) References Cited

U.S. PATENT DOCUMENTS

| | | |
|---|---|---|
| 2006/0261795 A1* | 11/2006 | Steele .......................... 323/288 |
| 2007/0257647 A1* | 11/2007 | Chen et al. .................... 323/282 |
| 2008/0088289 A1* | 4/2008 | Fogg et al. .................... 323/283 |
| 2008/0122419 A1* | 5/2008 | Shimizu et al. ............... 323/282 |
| 2008/0169793 A1* | 7/2008 | Okuda et al. .................. 323/271 |
| 2008/0224677 A1* | 9/2008 | Kim et al. ..................... 323/282 |
| 2008/0298101 A1 | 12/2008 | Kim et al. |
| 2009/0027020 A1* | 1/2009 | Qiu et al. ...................... 323/282 |
| 2009/0033299 A1* | 2/2009 | Ishino ........................... 323/282 |
| 2009/0146634 A1* | 6/2009 | Audy ............................. 323/290 |
| 2009/0160410 A1* | 6/2009 | Al-Shyoukh et al. ......... 323/266 |
| 2009/0315527 A1* | 12/2009 | Kung et al. .................... 323/282 |

\* cited by examiner

DC-DC CONVERTERS OPERABLE IN A DISCONTINUOUS SWITCHING MODE

This application claims the benefit of U.S. Provisional Application No. 61/228,002, filed Jul. 23, 2009, and U.S. Provisional Application No. 61/261,642, filed Nov. 16, 2009.

BACKGROUND OF THE INVENTION

1. Field of the Invention

This invention relates to voltage converters, especially to DC-DC or switched voltage regulators and to methods and apparatus for control of such regulators.

2. Description of the Related Art

In electronic equipment in general, and particularly for fast moving segments such as portable consumer devices such as mobile phones, MP3 players etc, there is a relentless push to use the latest processor technology to increase the device capability and feature set while reducing power and cost. As the next generation of processors start to become available, they need to operate from lower voltages than previous generation processors so as to allow use of the reduction in process feature size, i.e. W/L, that enables a greater level of integration such that it is beneficial in terms of reduced die size, reduced die cost and reduced power consumption. Typically such processors are powered via a DC-DC voltage converter which provides a regulated voltage to the processor.

These trends result in two design challenges for DC-DC converters to service these applications: one induced by the choice of the value of the low voltage; the other by battery technology lagging behind the change to lower processor supply voltages.

(i) The reduction in processor supply voltage requires a much tighter control—in absolute terms—of the DC-DC converter output voltage under all prevailing processor load and battery conditions. If the control over the processor supply voltage is not sufficient, problems with under or overvoltage may occur: both equally undesirable.

(ii) Since the battery terminal voltage has not dropped appreciably, and the duty cycle of a DC-DC converter is given by the ratio of $V_{OUT}/V_{IN}$, duty cycles must therefore reduce. This, coupled with the desire for small external components pushes the DC-DC converter to high operating frequencies, resulting in extremely short switch on i.e. conduction, times. The increase in switching speed afforded by the reduction in transistor feature size is not normally available for the power switches since the interface components must be rated to battery voltage.

Since small conduction periods, i.e. on times, of the power switches are difficult to control, it is becoming increasingly difficult to control the lower processor output voltages with adequate accuracy using traditional Peak Current Mode control methods. Valley Current Mode (VCM) is an alternative method of control of a DC-DC converter which has been proposed. This method of DC-DC loop control controls the input transistor off, i.e. non-conduction, time, rather than the on time. For the low duty cycle required, the non-conduction time is longer than the conduction time, so is therefore easier to control. Also VCM is known to offer an inherently higher bandwidth and an improved transient response.

SUMMARY OF THE INVENTION

It is therefore an aim of the present invention to provide improved control of DC-DC converters.

Thus according to the present invention there is provided a DC-DC converter comprising: an inductor operably connected between a first node and an output node; a high side switch operably connected between a high side supply input node and the first node; a low side switch operably connected between a low side supply input node and the first node; switch control circuitry operable to control the turn on of said high side switch based on a comparison of at least a first signal indicative of the current flow in the inductor with a second signal indicative of a difference between the voltage at the output node and a target voltage and operable such that said low side switch may be turned off prior to the high side switch turning on; wherein the switch control circuitry comprises emulation circuitry for emulating the change in inductor current during a period when both the high side and low side switches are turned off.

The DC-DC converter of this aspect of the invention thus has an inductor connected to a first node connected between high and low side supply switches. The high and low side supply switches are any suitable switches, such as power switches, for example PMOS and NMOS switches respectively, for connecting, in use, to high and low side supplies, e.g. a voltage input $V_{IN}$ and ground. The switches are controlled by switch control circuitry to control turn on of the high side switch based on a comparison of at least a first signal indicative of the current flow in the inductor with a second signal indicative of a difference between the voltage at the output node and a target voltage. In other words the DC-DC converter is operable in a current mode control where a signal representing the inductor current is compared with a threshold derived from the voltage output of the converter to control the duty cycle. As the skilled person will appreciate, one or more additional signals, for instance a slope compensation ramp signal, may be added to one or both of the current or voltage signals prior to comparison.

The switch control circuitry is operable to control the turn on of the high side supply switch. When first signal indicative of the current in the inductor reaches the threshold provided by the second signal, i.e. the voltage error signal, (including any slope compensation signals or the like), the high side switch is turned on. In this way the duty cycle of the converter is controlled. The converter is operable in a so called Valley Current Mode control. It will be appreciated that the converter of this aspect of the invention is operable in Valley Current Mode control but it may also be operable in other modes, such as Peak Mode if required.

In this embodiment of the present invention, the switch control circuitry is operable such that said low side switch may be turned off prior to the high side switch turning on. This means that there may be a period in the duty cycle where both of the high and low side switches are off. This may be referred to as a "discontinuous switching mode" as there is a discontinuity in the operation of the switches.

By turning the low side supply switch off before the high side switch turns on efficiency savings can be obtained as will be described in detail later. However, during the period that both switches are off, current mode control of the converter may be difficult to achieve. This embodiment of the present invention therefore comprises emulation circuitry for emulating the change in inductor current during a period when both the high side and low side switches are turned off. The emulated change in inductor current can be used by the switch control circuitry in control of when to turn on the high side switch and the emulated change in inductor current can be used in the comparison of the first and second signals. Thus current mode control of the converter is preserved even when the switch arrangement is off, i.e. both the high side and low side switches are off.

The switch control circuitry may comprise current sense circuitry for determining the current flow in the inductor from the electrical properties of the low side switch when the low side switch is turned on and wherein the output of said current sense circuit comprises the first signal when the low side switch is turned on.

The current flowing through the low side switch, and hence through the inductor, can be determined by the electrical properties of the low side switch when it is turned on. For a transistor switch, such as an NMOS switch, the source-drain voltage of the transistor is proportional to the current flow through the channel and this can be used as the basis of the first signal, although the current sense circuit may trim, i.e. adjust or condition, the signal derived from the source-drain voltage to a more appropriate level. By using the electrical properties of the low side switch to derive the first signal indicative of the inductor current no additional sense resistor is required. As will be appreciated the use of sense resistors to allow sensing of the inductor current would introduce associated resistive losses into operation of the converter. Thus the present invention provides a lossless current mode control. However when the low side switch is off the electrical properties of the switch can no longer be used to derive the inductor current. The emulation circuit however emulates the change of inductor current during a period when both switches are off and hence the emulated change in current can be used when the low side switch is off. This embodiment of the present invention therefore allows lossless current sensing but maintains control of the current loop when the low side switch is off.

The switch control circuitry may comprise threshold monitoring circuitry for determining the current flow in the inductor from the electrical properties of the low side switch when the low side switch is turned on and monitoring current flow in the inductor against a threshold and wherein the switch control circuitry is arranged to turn the low side power switch off when the threshold is reached.

The threshold monitoring circuitry acts to turn the low side power supply switch off if the current flow in the inductor drops to a defined threshold. When the low side switch is turned on, the current in the inductor drops steadily until the comparison of the first and second signal results in the high side switch being turned on—and thus the low side switch being turned off. In some operating conditions however, at relatively low load current demand, the inductor current would drop to zero and then go negative before the high side switch was turned on. This reversal of current in the inductor means that current would be flowing away from the load (i.e. away from an output capacitor) and to the low side supply. This is inefficient as charge previously supplied via the high side supply is effectively wasted. By setting the low side switch to turn off when the inductor current reaches a threshold level at least some of the period of negative, or reverse, inductor current flow may be prevented. The threshold may be set at zero current but propagation delays and the like mean that there would be a delay between the inductor current reaching the threshold and the low side switch actually being turned off. During this time the inductor current may have decreased further, i.e. a reverse current flow may have started. The threshold is therefore preferably set to a positive level such that the low side switch is turned off before the current flow in the inductor reverses direction. Preferably the threshold level is set as low as possible allowing for voltage offsets and propagation delays to ensure that the inductor current does not reverse direction. However a small current reversal may be tolerated in some applications. The threshold level may be fixed or may be configurable and may be changed in operation depending on the operating conditions of the converter, such as the target output voltage.

The emulation circuitry may be any circuitry for emulating the change in inductor current when the low side switch is turned off. As explained in detail later when a low side switch such as a NMOS switch is turned off, when current is still flowing in the inductor, current will still flow through a parallel path. For instance the current may flow through a parasitic body diode associated with the switch. This inductor current flow will decrease at a certain rate based on the output voltage, the inductance of the inductor and the properties of the parallel path. The emulation circuitry emulates this change in inductor current. The emulation circuitry may comprise circuitry for supplying an emulated current signal when the low side switch is off. Thus the first signal indicative of the current in the inductor could comprise the output of the current sense circuit when the low side switch is turned on. When the low side switch turns off the first signal could be replaced with the signal generated by the emulation circuitry. Whilst such an approach is possible, switching between different signals is not the preferred approach due to issues of ensuring a smooth transition.

In one embodiment the emulation circuitry comprises a hold circuit for holding a value of the current flow in the inductor before the low side switch turned off. The current flow in the inductor is determined during the period in which the low side switch is turned on, for example by the current sense circuit described above. Thus an electrical property of the switch, e.g. the source-drain voltage, is used to determine the inductor current. When the low side supply switch turns off this property can no longer be used to determine the inductor current and so the existing value of the signal is held constant. This held current signal can act as a reference and means that only the degree of change, and not the absolute value, of inductor current need be emulated.

The emulation circuitry may therefore introduce a time varying offset into the first and second signals to represent the change in inductor current. In one embodiment the emulation circuitry comprises circuitry for generating a first ramp signal, i.e. a signal which changes with time, and means for applying the first ramp signal to at least one of the first signal and the second signal with said ramp signal when the low side switch is turned off. The ramp signal may be applied to the first signal or to the second signal prior to comparison. Thus the first signal may comprise the held value of inductor current with a negative ramp applied so that the first signal emulates the actual inductor current. Alternatively the ramp signal could be a positive ramp applied to the second signal. In another arrangement the first ramp signal may be applied to one of the first and second signals and a second ramp signal may be applied to the other of the first and second signals, wherein the difference between the first and second ramp signals corresponds to the emulated change in inductor current.

In one embodiment the DC-DC converter comprises a slope compensation circuit for applying a slope compensation ramp signal (or signals) to one or both of the first and second signals prior to comparison. Slope compensation is a known technique to prevent sub-harmonic oscillation. In one embodiment of the invention the first ramp signal is applied to a slope compensation ramp prior to the slope compensation ramp being applied to the first and/or second signals. The skilled person will appreciate that the first ramp signal being applied to the slope compensation ramp signal, which is then applied to the first and/or second signals will have the same effect as applying the first ramp signal directly to the first or second signals. Applying the first ramp signal to the slope compensation ramp signal will change the slope of the slope compensation ramp signal. In one embodiment the slope compensation circuit comprises the circuitry for generating a first ramp signal and is configured to generate an output signal with a first slope corresponding to a slope compensation ramp signal or a second slope corresponding to a slope compensation signal combined with the first ramp signal. In other words the circuitry for producing the first ramp signal is part of slope compensation circuitry and acts to change the slope of the output signal.

The rate of change of the inductor current when the low side switch is off is generally equal to $(V_{OUT}+\Phi)/L$ where $V_{OUT}$ is the present output voltage, $\Phi$ is a voltage drop associated with the parallel path, e.g. a voltage drop associated with a diode voltage, and L is the inductance of the inductor. The inductor current will therefore typically decrease more rapidly when the low side switch is off. The first ramp signal may therefore have a slope magnitude equal to or around $(V_{OUT}+\Phi)/L$. Where the first ramp signal is combined with the slope compensation signal it will be appreciated that this slope refers to the change in slope from an output comprising the slope compensation signal alone. If the change in inductor current is emulated by applying different ramp signals to the first and second signals this slope refers to the slope of the ramp created by the combined signals. It may be easier however to approximate the slope and in one embodiment the slope of the first ramp signal may be $(V_{OUT})/L$. This slope emulates the change in inductor current with a slight inaccuracy. This emulated change still gives good performance however and may be easier to implement in practice where the output voltage is programmable.

As the low side switch is turned off before the inductor current reaches zero the current may flow through a parallel path such as a body diode as described above. However eventually the inductor current will reach zero and, as the body diode does not conduct in the other direction, no further current will flow. Thus there will be no further change in inductor current until the high side switch turns on. Preferably therefore the ramping of the first ramp signal is stopped when the inductor current is substantially zero. In other words the slope of the ramp signal changes to have a gradient of zero once the inductor current is substantially zero. Although the ramping of the ramp signal is stopped at this point, i.e. the slope change to zero, in some embodiments it is necessary to hold the value of the ramp signal at whatever value it was at when the inductor current reaches zero. For instance, in an embodiment where a held current signal is used as the first signal, the ramp signal is applied in such a way that the effective value of the current contribution in the comparison is reduced over time. When the inductor current reaches zero the contribution from the ramp signal therefore effectively compensates for the value of the held current signal. The value of the ramp signal at this point should therefore be maintained to continue to compensate for the value of the held current signal.

The inductor current reaching zero could be determined using the held current value and the first ramp signal, i.e. when a signal having the slope of the first ramp signal reaches the level of the held current value it can be assumed that the inductor current is zero. In one embodiment however the fact that the inductor current is zero is directly detected. Whilst the low side switch is still conducting through a body diode, the first node will be held at a voltage level equal to a diode voltage below ground. Once the inductor current ceases the first node will fly high. The converter may therefore comprise a circuit for detecting when the first node crosses a voltage threshold after the low side switch is turned off. The voltage threshold could be a voltage of zero or it could be a small positive voltage. The output of the circuit for detecting when the first node crossed the voltage threshold could therefore be used as an indication to stop ramping of the first ramp signal.

It will be appreciated that if the ramping of the first ramp signal is stopped before the high side switch is turned on this is because the inductor current has reached zero and will not change until the high side switch is turned on. Thus the emulation circuitry in this regime is emulating the inductor current, which is constant no current.

It should be noted that the embodiments of the present invention described are applicable to DC-DC converters where the switching cycle is defined by clock edges of an appropriate clock signal. An appropriate edge of a clock pulse, i.e. the leading or trailing edge is used to start a cycle and the same edge of a subsequent pulse is used to define the start of the next cycle (and hence the end of the present cycle). Such DC-DC converters allow constant frequency operation as fixed by the clock signal.

An alternative and common approach is to use a constant on-time converter. In such a converter the on-time of one of the low and high side switches is kept constant. For instance, in a valley mode constant on-time converter, the on-time of the high side switch may be fixed. Thus the high side switch is turned on for a constant period of time and then turned off and the low side switch turned on. The low side switch turns off when the valley current reaches the threshold limit set by the voltage error and the high side switch turns on for the constant on time again. The frequency of switching is thus generally defined by the duration of the constant on time, and the input and output voltages $V_{IN}$ and $V_{OUT}$. For any given constant on time the switching frequency in continuous conduction mode will increase with increasing output voltage or reducing input voltage.

The embodiments of the invention described above are applicable to constant frequency converters and the constant on time converters. However DC-DC converters allowing constant frequency operation offers several advantages over constant on-time converters. Operating at a constant frequency means that the frequency of operation is known in advance and the designer of the device that uses the DC-DC converter can take this into account. Thus interference due to the switching frequency of the DC-DC converter can be avoided and line filters or notch filters and the like can be designed and used in the device with a knowledge of the switching frequencies to reduce interference. Further in a device with several constant frequency DC-DC converters the clock signals for the converters may be phased to reduce the total combined input current ripple, i.e. to arrange the high side on time of one converter to occur during, or at least overlap with, the high side off time of another converter. This can reduce the stress on the supply input capacitor and the peak current requirements of the common supply.

In preferred embodiments of the present invention therefore the converter is one where the switching cycle is defined by clock edges of a clock signal. The skilled person will of course appreciate that the converter may be designed to operate at more than one different switching frequency and an appropriate frequency may be selected in use by selecting an appropriate clock signal. For example a converter may be operable at a first fixed frequency based on a first clock signal or a second fixed frequency based on a second clock signal. This allows the converter to balance efficiency against transient performance. As the skilled person will be aware higher switching frequencies mean more switching losses but generally better transient performance. At lower current loads, transient performance may be less of an issue and the frequency may be switched to a lower frequency clock signal to improve efficiency. In any case however the possible frequencies of operation are known in advance and fixed by the first and second clock signals and are not continually variable according to small changes in load.

The skilled person will also appreciate that it is common to apply small amounts of dither to a clock signal to vary the switching frequency slightly. This is a known change however which is achieved (generally) though prearranged variation of the clock signal. Again the device designer will be aware of the degree of dither that will be applied and the switching frequency will be maintained within a small set range defined by the amount of dither. As used in this specification the term constant frequency applied to switching frequencies shall be taken to mean that the switching cycle is controlled based on clock edges of a clock signal, including clock signals that are dithered.

The switch control circuitry may be operable to prevent turning the high side switch on in a cycle if the period between turning the high side switch on and turning the high side switch off would be less than a first time period. The DC-DC converter in this embodiment of the invention thus is arranged to prevent turn on of the high side switch in a cycle. This mode of operation is referred to a pulse skip mode. This embodiment of the present invention implements a pulse skip mode based on a minimum conduction time.

As described above, in a constant frequency valley current mode converter, the switching cycle is defined by relevant clock edges. As also discussed above, in operation the low side switch may turn on at the start of the cycle in response to a clock edge. During the cycle the switch control circuitry may turn the low side switch off and may, at the same time or later, turn the high side switch on based on the current and voltage loop controls. The cycle ends and the high side switch may be turned off in response to the next relevant clock edge, which also starts the next cycle.

However if the high side switch attempts to turn on towards the very end of a cycle (e.g. if the loop control requests a very small duty cycle) it may not be possible for the high side switch to turn on for the short time needed and then turn off correctly at the beginning of the next cycle. Thus to avoid problems of control of the high side switch for very short on periods, and also to take advantage of the power savings inherent in a pulse skip mode, in this embodiment of the present invention the high side switch is not turned on if the time remaining till the end of the present cycle/start of the next cycle is less than a first time period, i.e. if the period between turning the high side switch on and turning the high side switch off would be less than the first time period. If the high side switch has not already turned on before this time period at the end of the cycle is reached then the high side switch is not turned on at all that cycle and thus the converter starts pulse skipping.

The switch control circuitry may therefore comprise a first timer circuit for producing a first inhibit signal which inhibits turn on of the high side switch, for a time period substantially equal to the first time period, before the start of the next cycle.

The first timer circuit may comprise an input for receiving an input clock signal, a delay for producing a delayed clock signal and circuitry for generating the first inhibit signal based on the input clock signal. By producing a delayed clock signal, which is used to define the cycle period, the time before start of the next cycle can be accurately known.

In pulse skip mode, as the high side switch is not turned on in a cycle, the low side switch remains off in the following cycle.

The switch control circuitry may further comprise a second timer circuit for determining the duration between a clock edge starting a cycle and the inductor current reaching zero, wherein the switch control circuitry is operable to prevent the low side switch from turning on in a subsequent cycle if said duration is less than a second time period.

If the current demand falls low enough it may not be possible to turn the low side switch off in a cycle before the inductor current reverses due to propagation delays and the like, i.e. the current at the start of the cycle when the low side switch would turn on may be so low that the current would drop below zero before the low side switch could be turned off. In this embodiment of the invention therefore if the inductor current reaches zero before the second time period after the clock edge (which represents the start of the cycle and which would potentially turn the low side switch on) the low side switch is prevented from turning on in a subsequent cycle. Thus the high side switch may be turned on in one cycle but the low side switch would remain off in the following cycle. As described above, when the low side switch is off current may flow through a parallel path such as an NMOS body diode, but this current will not reverse. This mode of operation therefore prevents the inductor current from going substantially negative. The low side switch may be prevented from turning on in the very next cycle but, if that next cycle the converter has switched to pulse skip mode (and hence the high side switch was not turned on) the low side switch would not be turned on anyway. Preferably therefore it is the next cycle where the low side switch would have turned on, i.e. the next cycle following one in which the high side switch is on, when turn on of the low side switch is inhibited.

The DC-DC converter may be operable in a first mode where the low side switch may be turned off prior to the high side switch turning on and a second mode where the low side switch may only be turned off when the high side switch is to be turned on. In other words the converter may be operated as described above or in a forced continuous conduction mode where one of the high side switch and the low side switch is always on when the converter is operational.

The DC-DC converter according to these embodiments of the invention therefore provide a converter that can be controlled to low load current demand and which offers high efficiency. Consider a buck converter, with an inductor switched between a supply $V_{IN}$ and Ground by a PMOS and an NMOS transistor respectively. Under high or medium current demand, the inductor current, composed of an average component and a ripple, remains above zero through every cycle. This is termed Continuous Conduction Mode (CCM). As the load current demand decreases, it is advantageous for efficiency reasons to alter the control so that the current in the inductor goes to zero for some of each cycle to avoid ripple being large enough to cause a reverse in the current in the inductor. This is termed Discontinuous Current Mode (DCM). At even lower load currents it is advantageous to "pulse-skip".

These various modes present different control problems and dynamics, and it is important to be able to transition between modes seamlessly without transients appearing during changeover. This aspect of the present invention provides a control mechanism that achieves these efficiency benefits and maintains control over the current loop of the converter.

In another aspect of the present invention there is provided a method of controlling a DC-DC converter comprising an inductor operably connected between a first node and an output node; a high side switch operably connected between a high side supply input node and the first node; and a low side switch operably connected between a low side supply input node and the first node; the method comprising: controlling the turn on of said high side switch based on a comparison of at least a first signal indicative of the current flow in the inductor with a second signal indicative of a difference between the voltage at the output node and a target voltage; turning the low side switch off prior to turning the high side switch on; and emulating the change in inductor current during a period when both the high side and low side switches are turned off.

This method of the present invention offers all of the same advantages and can be used in all of the same embodiments as described with reference to the first aspect of the invention.

In another aspect of the invention there is provided a DC-DC converter comprising: an inductor connected between a first node and an output node; a PMOS switch operably connected between a voltage input node and the first node; an NMOS switch operably connected between a ground input node and the first node; control circuitry operable to control the turn on of said PMOS switch based on a comparison of at least a current sense signal indicative of the current flow in the inductor with a voltage error signal indicative of a difference between the voltage at the output node and a desired voltage and operable such that NMOS switch may be turned off prior to the PMOS switch turning on; wherein the control circuitry comprises circuitry for emulating the change in inductor current during a period when both the PMOS and NMOS switches are turned off.

In yet another aspect of the invention there is provided a DC-DC converter comprising an inductor operably connected between a first node and an output node; a high side switch operably connected between a high side supply input node and the first node; a low side switch operably connected between a low side supply input node and the first node; and switch control circuitry operable to control the high and low side switches in a valley current mode such that the low side switch may be turned off before the high side switch is turned on.

The switch control circuitry may comprise emulation circuitry for emulating the change in inductor current when both the high and low side switches are turned off.

In a further aspect of the invention a DC-DC converter comprises a high side supply switch and a low side supply switch operable in a mode where the low side supply switch may be turned off before the high side supply switch is turned on wherein, in said mode the turn on of said high side supply switch is controlled based on an emulated current signal.

Another aspect of the invention relates to a method of controlling a DC-DC converter comprising a high side supply switch and a low side supply switch, the method comprising turning said low side supply switch off before turning the high side supply switch on and controlling the turn on of said high side supply switch based on an emulated current signal.

In another aspect the invention provides a DC-DC converter comprising a high side supply switch, a low side supply switch and a valley current mode controller which has a continuous transition between a continuous switching mode wherein the high side switch is turned on when the low side switch is turned off and discontinuous switching mode wherein the low side switch is turned off before the high side switch is turned on.

These aspects of the invention address issues associated with loss of current signal in DCM using the "lossless" approach to current sensing on an unisolated CMOS process and provide seamless transfer between CCM and DCM. These aspects of the invention also maintain control over the feedback loop under extremely low output current conditions and in pulse-skip modes under Valley-Current Mode Control.

The problem of oscillations due to loss of inductor current information and feedback when the switch is off and the current flows through a parallel path is solved by holding the current information while the switch is off and generating a ramp signal indicative of the current slope. In general this aspect of the invention relates to generating a signal indicative of the change in current flow in the inductor over time when the switch is off. This signal representative of the change in current flow in the inductor can be used in a comparison step which is used to determine when to control a switch of the DC-DC converter.

The DC-DC converter may be a valley-current-mode DC-DC converter. The parallel path could be the NMOS bulk diode. The ramp could be added to the sense signal or added to the modulator ramp signal. The compensation could be $V_{OUT}/L$ or more exactly $(V_{OUT}+\Phi)/L$. The output stage and/or the control loop could be integrated. The converter may be used in a system with varying power demands, possibly a portable device such as a mobile phone or MP3 player.

Also the problem of NMOS current reversal in light loading is mitigated by detecting if the output current crosses zero before a time threshold that is longer than the minimum NMOS on time set by the propagation delay from the zero-current comparator, and if so, disabling the NMOS in the next cycle. The advantage is that valley mode control is maintained down to very light loads and the efficiency is only sacrificed when direct NMOS control is no longer possible. The diode mode of operation could also occur in non-pulse-skipping mode, say in DCM with a very short PMOS on-time and a high Vout relative to $V_{IN}$-$V_{OUT}$ giving a fast NMOS current slew rate, giving power dissipation savings.

One aspect of the present invention relates to a DC-DC converter having a switch arrangement for controlling the input of an inductor, e.g. a PMOS switch connected between a voltage input and an input node for the inductor and an NMOS switch connected between the input node of the inductor and ground (or possibly some other reference voltage). The converter has circuitry for representing the inductor current when the switches of the switch arrangement are off. The circuitry for representing the inductor current may comprise circuitry for holding a value representing the current at the time that one of the switches (e.g. the NMOS transistor) turns off. The converter may include circuitry for emulating the current change of the inductor when the switch arrangement is off. The emulated current may be used to determine when the switch arrangement (e.g. the PMOS transistor turns on).

In another aspect of the present invention is a method of operating a DC-DC converter wherein operation of a switch (e.g. the PMOS transistor) of a switch arrangement controlling the input of an inductor is based on a comparison of a current signal representing the current in the inductor with a voltage error feedback signal (based on the difference between the output voltage of the DC-DC and a reference signal, wherein, in one mode of operation the switch arrangement is off (e.g. both the NMOS and PMOS transistors are off) and wherein an emulated current slope is added to at least one of the signals used in the comparison.

This aspect of the present invention allows the DC-DC converter to operate in a continuous transition from CCM to DCM mode or vice versa.

Conveniently the output voltage of the NMOS switch is used to determine the zero crossing time. In general however this aspect of the invention relates to means of preventing current reversal and especially to circuitry for determining a forward current duration for the NMOS and for preventing the NMOS from turning on in the subsequent cycle if the forward current duration is less than a first duration.

The present invention provides a practical Valley Current Mode converter that can be used, with current mode control, for a variety of applications. Embodiments of the present invention realise an integrated circuit (IC) arrangement and in particular a power management integrated circuit (PMIC) arrangement comprising a Valley Current Mode converter. An embodiment of the Valley Mode converter comprises a fixed frequency valley mode converter, i.e. a converter having a switching frequency which is based on a predetermined clock signal. The Valley Current Mode converter may be operable in Continuous Current Mode (CCM), Discontinuous Current Mode (DCM) and/or a transitional phase between DCM and CCM. The valley mode converter may comprise a valley mode converter operable in a pulse skip mode. The valley current mode converter may be controlled based on the same control loop in all of these modes of operation, i.e. the loop that provides control in CCM also provides control in DCM.

Embodiments of the invention provide current mode converters, especially valley current mode converters, with lossless current sensing. Lossless sensing techniques avoid the use of separate sense resistors with the associated losses. Preferably the converter is fully integrated in that the high and low side switches are integrated within an IC/PMIC in addition to the converter and the internal (preferably lossless) current sense circuits. A fully integrated lossless valley current mode converter represents a novel embodiment of switched converter. Preferably the lossless and/or fully integrated converter is operable at a fixed switching frequency. A converter comprising lossless sensing and enabling CCM and DCM operation is thus provided by the present invention and a novel IC/PMIC may comprise such a converter.

The ability to operate at a fixed frequency is a particular advantage of the embodiments of the present invention and in general one aspect of the invention relates to a fixed frequency converter which is operable in non-CCM modes of operation, whether full DCM and/or a transitional phase between CCM and full DCM and/or a pulse skip mode of operation.

The various aspects of the present invention are described principally with reference to buck converters but other embodiments of the invention provide boost converters or buck-boost converters.

BRIEF DESCRIPTION OF THE DRAWINGS

The invention will now be described by way of example only with reference to the following drawings, of which.

DETAILED DESCRIPTION

Figure 1:
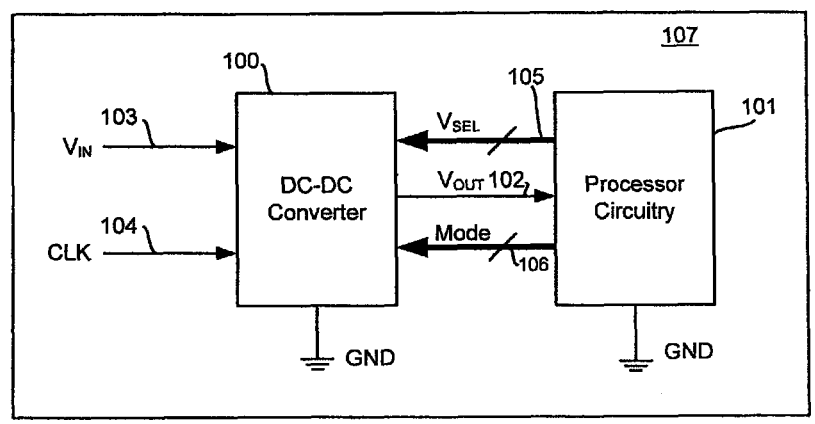
FIG. 1 shows a typical arrangement of a DC-DC converter arranged to power processor circuitry.

FIG. 1 shows a typical application where processor circuitry 101, which may, for example, be a processor of a portable electronic device 107, is supplied with a voltage $V_{OUT}$ 102 by a DC-DC converter 100. The DC-DC converter 100 receives an input voltage $V_{IN}$ 103 and an external clock signal CLK 104 and outputs the required voltage output $V_{OUT}$ 102. It is usual for the supply voltage of a processor to be reduced when the processor is idling in order to save power, and then to ramp up to a more normal operating voltage where the processor may achieve full operating speed. The processor circuitry 101 therefore provides voltage select signals $V_{SEL}$ 105 to the DC-DC converter 100 to select an appropriate voltage output $V_{OUT}$. The voltage select signals may be digital signals for controlling a programmable element of the DC-DC converter, such as a level shifter, as will be described later. The DC-DC converter 100 may also be operable in various modes, as will be described later, and the processor circuitry may select a particular mode of operation by appropriate mode control signals MODE 106. It will be appreciated that DC-DC converters may be used to provide power to device sub-systems other than processors and the embodiments described herein are generally applicable to many DC-DC converters or switched voltage regulators used for many applications.

Figure 2:
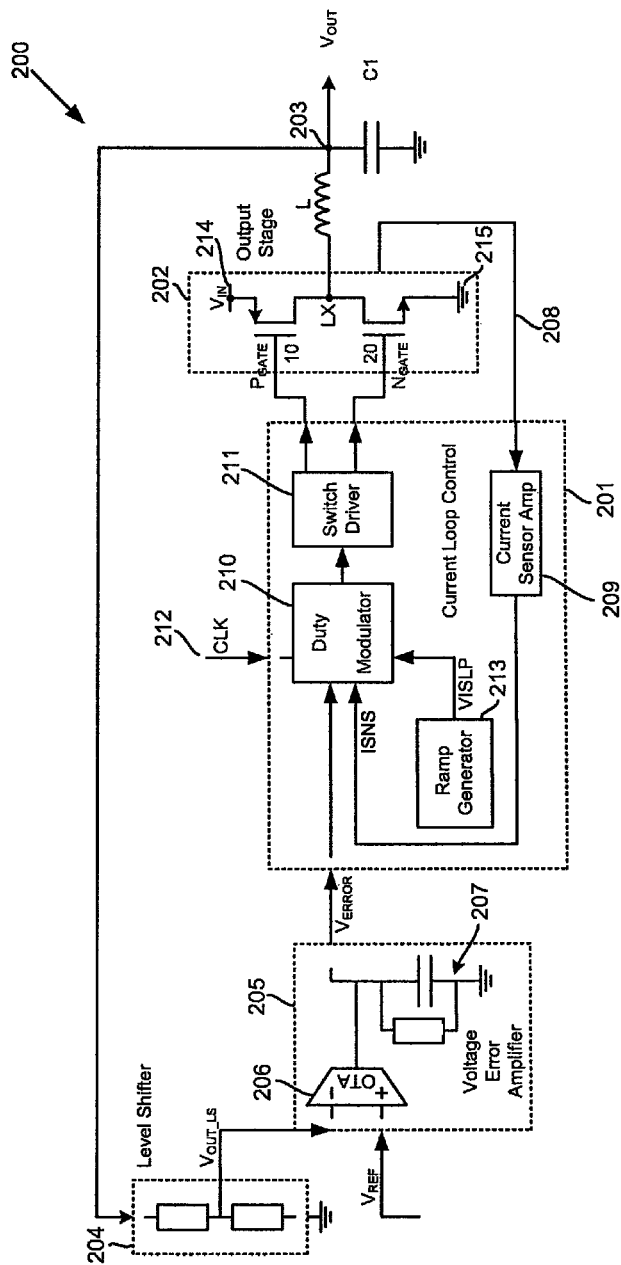
FIG. 2 illustrates a conventional DC-DC converter.

A conventional current-mode buck (i.e. step down) DC-DC converter 200 is shown in simplified form in FIG. 2. The converter 200 comprises two nested feedback loops, an inner Current Control loop and an outer Voltage Control loop.

The Current Control loop block 201 takes an input signal $V_{ERROR}$ and a current sense signal ISNS fed back from the output stage and generates pulse-width modulated drive signals for the output stage 202. The voltage on the output stage output node LX is switched between ground and supply, $V_{IN}$, at a controlled duty cycle, resulting in a triangular current waveform in the inductor L. The inductor L and output capacitor C1 act as a filter to ensure an average voltage $V_{OUT}$ at an output node 203.

In operation the inductor current is sensed, and compared with $V_{ERROR}$. So this feedback loop generates an output sensed current varying according to the input signal $V_{ERROR}$. In many conventional DC-DC converters the sensed current is a peak current, although it is known to use an average current in some converters. In embodiments of the present invention to be described the minimum or "valley" current is used to control the duty cycle of the converter.

Variation of the delivered output current, smoothed by the output filter L, C1, modulates the output voltage at $V_{OUT}$. This voltage $V_{OUT}$ is fed back, translated down to an appropriate voltage $V_{OUT\_LS}$ by a Level Shifter, or Voltage Shifter, block 204, to the input of a Voltage Error Amplifier block 205. The Voltage Error Amplifier block 205 compares this processed version of $V_{OUT}$ with a supplied reference voltage $V_{REF}$ and provides the error signal $V_{ERROR}$ which drives the above described inner feedback loop to close the outer feedback loop and thus stabilise $V_{OUT}$ at the desired voltage.

The Level Shifter 204 is illustrated as a resistive potential divider, but could be other voltage scaling or voltage-shifting circuitry, or even be a direct connection if the required $V_{OUT}$ is equal to $V_{REF}$. The level shifter, applies a conversion to the level of $V_{OUT}$ such that, when $V_{OUT}$ is equal to the desired or target output voltage, the level shifted signal $V_{OUT\_LS}$ has a known relationship to the reference voltage $V_{REF}$ (e.g. the level shifted signal $V_{OUT\_LS}$ may be equal to $V_{REF}$ when $V_{OUT}$ is exactly the desired output voltage). The Level Shifter may be programmable, mechanically or digitally, to provide different voltage scaling or shifting circuitry, so as to allow the converter to be configurable to output different values of $V_{OUT}$. For instance, it may be programmable by a digital multi-bit signal, such as the VSEL signal generated by a processor as shown in FIG. 1.

The Voltage Error Amplifier Block 205 is illustrated as including an Operational Transconductance Amplifier (OTA) 206 driving an RC network 207, but could include some other amplifier. The RC network 207, or other passive impedances, provide closed-loop stabilisation.

The Current Loop Control block 201 receives a signal 208 from the output stage 202 which passes through a Current Sensor Amp block 209 to pre-condition it, for instance to scale or strobe the signal, representative of the inductor current, to generate a convenient current sense signal ISNS. A duty modulator 210 compares the ISNS signal to the input $V_{ERROR}$ to derive drive signals of the appropriate duty cycle to drive the output stage devices 10, 20 on and off via a Switch Driver buffer stage 211. The Duty Modulator may require a clock signal 212 and a Ramp Generator 213 to generate the necessary sequence of pulses as would be understood by one skilled in the art. Ramp Generator 213 may generate a slope compensation ramp signal which may be added, either in whole or in part, to the ISNS signal and/or the $V_{ERROR}$ signal so as to prevent sub-harmonic oscillations as would be well understood by one skilled in the art.

The Output Stage 202 in general will have a high-side driver device such as a PMOS transistor 10 to switch the output to the high-side supply rail 214 ($V_{IN}$) and a low-side driver device such as an NMOS transistor 20 to switch the output to the low-side supply rail 215 (Ground). The Output Stage 202 is also required to supply information, i.e. an indication, of inductor current signal 208, to feed back to the Current Control block 201.

The inductor current could be sensed using a series resistor in series with the inductor or the respective transistor. However the use of such series resistors introduces an extra source of resistive power loss and thus reduces the efficiency of the converter. Efficiency is, especially for battery powered devices, an important consideration. It is preferable therefore to use "lossless" sensing techniques, for example to sense the drain-source voltage across the PMOS due to its on resistance. This gives a voltage proportional to the PMOS current.

In operation of a conventional peak mode DC-DC converter the PMOS switch is turned on at an edge of the clock signal 212. In the lossless current sensing approach, i.e. in embodiments not having a sense resistor, the drain-source voltage of the PMOS is monitored to derive a current signal proportional to the current through the PMOS 10 and hence the inductor L. This current signal, appropriately scaled, is compared to the threshold $V_{ERROR}$ signal. When the current reaches the threshold the PMOS is turned off by switch driver 211 and the NMOS is turned on, i.e. the switching occurs at the peak of the inductor current. Practically a slope compensation ramp signal is applied to either or both the current signal or $V_{ERROR}$ signal prior to the comparison to prevent sub-harmonic oscillation. The effect is therefore that the current signal is compared with a threshold that ramps across each cycle.

The bandwidth of the current control loop is high, generating the appropriate pulse width on a cycle-by-cycle basis, whereas the bandwidth of the outer, voltage control, loop is relatively low, so the current loop may be analysed assuming a substantially static input voltage $V_{ERROR}$.

The terminal LX of the inductor L is switched to $V_{IN}$ for a fraction D of each clock cycle and to ground for the remaining fraction 1-D of each cycle. The average voltage at node LX is thus $D*V_{IN}$. The output capacitor C1 is large enough for the voltage $V_{OUT}$ to be substantially constant within each cycle, so the average voltage at $V_{OUT}$ is also $D*V_{IN}$. So for small $V_{OuT}$ relative to $V_{IN}$, the duty cycle $D=V_{OUT}/V_{IN}$ may be small.

Also there is a push towards faster clocking frequencies to allow the use of lower value, physically smaller, inductors, which would further reduce the PMOS on-time, and the time available to sense its current.

As mentioned previously control of very short switching times is difficult. Embodiments of the present invention therefore use Valley Current Mode (VCM) control. In VCM the NMOS switch 20 is turned on at a clock edge and the current in the inductor during the NMOS conduction period is monitored. When the inductor current drops to the $V_{ERROR}$ threshold (as modified by the slope compensation ramp) the NMOS is turned off and the PMOS is turned on, i.e. the switching is controlled by the lowest inductor current or the valley current. For short duty cycles the NMOS switch may be turned on for significantly longer than the PMOS switch and so Valley Current Mode control can ease some aspects of control of a DC-DC converter at low voltages.

Figure 4:
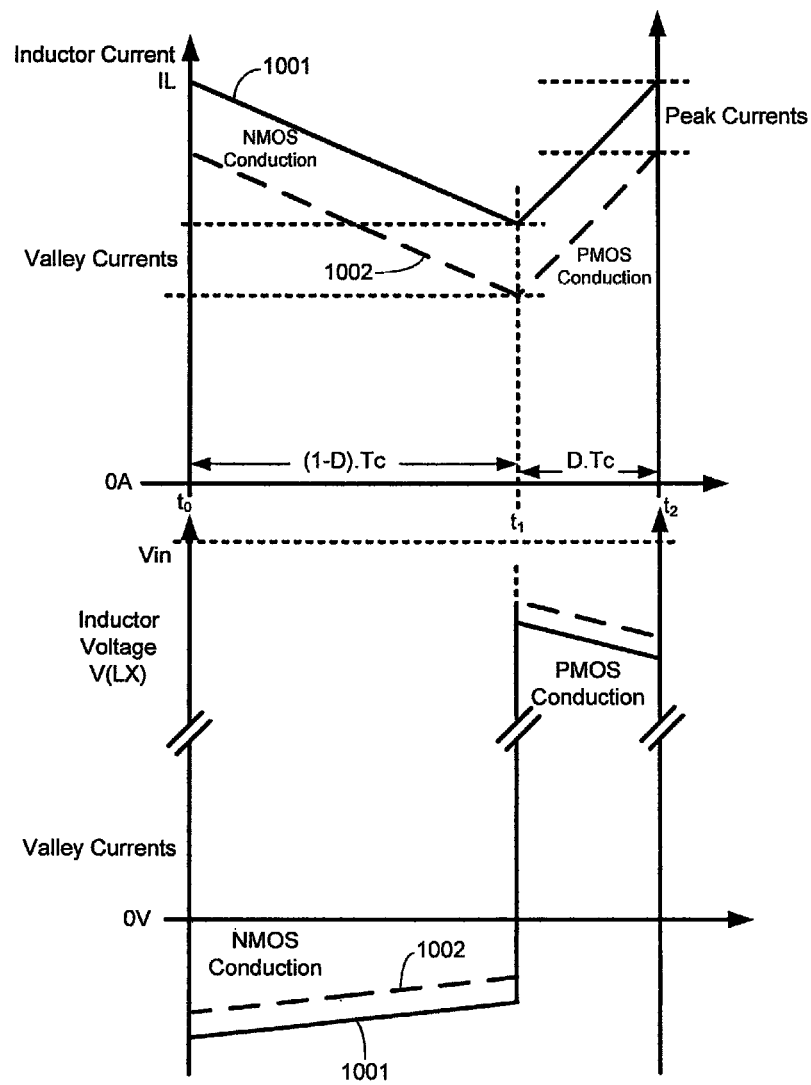
FIG. 4 shows inductor current and voltage waveforms at a certain level of current demand.

FIG. 4 illustrates the inductor current and the voltage at the output stage output terminal, LX, during one cycle of a set of repetitive cycles. The solid curves 1001 show waveforms for a higher average current, the dashed curves 1002 show waveforms for a lower current (assuming constant $V_{IN}$ and $V_{OUT}$). The upper part of FIG. 4 shows the current curves at node LX and the lower part of the figure illustrates the voltages at node LX. During the first part of the illustrated cycle, i.e. between $t_0$ and $t_1$, the NMOS is conducting and LX is near ground while the other end of the inductor is kept at $V_{OUT}$ by the output capacitor. The current therefore decreases at a slope $dI_L/dt=V_{OUT}/L$. During the second part of the cycle, i.e. between $t_1$ and $t_2$, the PMOS is conducting and the voltage of node LX is near supply, $V_{IN}$, while the other end of the inductor is kept at $V_{ouT}$ by the output capacitor, so the current increases at a slope $dI_L/dt=(V_{IN}-V_{OUT})/L$. If the load current demand decreases the current waveform maintains substantially the same slopes, but moves downwards to reduce the average current supplied to the capacitor and eventually to the load, as illustrated by dashed curve 1002 representing a lower average current. As shown in the lower part of the FIG. 4, the voltage at LX does not quite reach ground or $V_{IN}$ while passing this current, due to the I.R drop of the conducting NMOS or PMOS. For a converter with good efficiency, these I.R drops are small compared to $V_{OUT}$, so do not greatly affect the current waveforms, but are exaggerated in FIG. 4 for the purposes of explanation.

As mentioned, if the load current demand decreases, for a constant $V_{OUT}$ and $V_{IN}$ the current waveforms shown in FIG. 4 will fall. The required valley current may fall to zero or may go negative as the current demand decreases. The inductor current going negative is inefficient as this means that the output capacitor is charging back into the converter (and to ground through the NMOS switch). In essence charge supplied to the output capacitor C1 is therefore wasted.

One aspect of the present invention therefore provides a mode of operating a DC-DC converter in Valley Current Mode that prevents the inductor current from reversing, i.e. the current flow going negative and charging back to the DC-DC converter. This aspect of the present invention relates to control mechanisms for DC-DC converters that maintain a high efficiency.

In this mode of operation the low side supply switch, i.e. the NMOS, is turned off before the inductor current goes negative. The low side switch is therefore turned off before the high-side PMOS switch is turned on. In other words there is a divorce in the points in the inductor current cycle between the turn-off of the NMOS power switch, and the turn-on of the PMOS power switch, so there is a phase where neither conducts, and possibly even a phase of no inductor current.

Operation in a mode where the inductor current is maintained at zero for part of the duty cycle is known as Discontinuous Conduction Mode (DCM) or sometimes as Discontinuous Current Mode. DCM is a known mode of operation in Peak Mode Control DC-DC converters. This aspect of the present invention implements DCM in a Valley Current Mode control system. Operation of a DC-DC converter where there is no divorce in switching between the PMOS and NMOS is referred to a Continuous Conduction (or Current) Mode (CCM).

Figure 5:
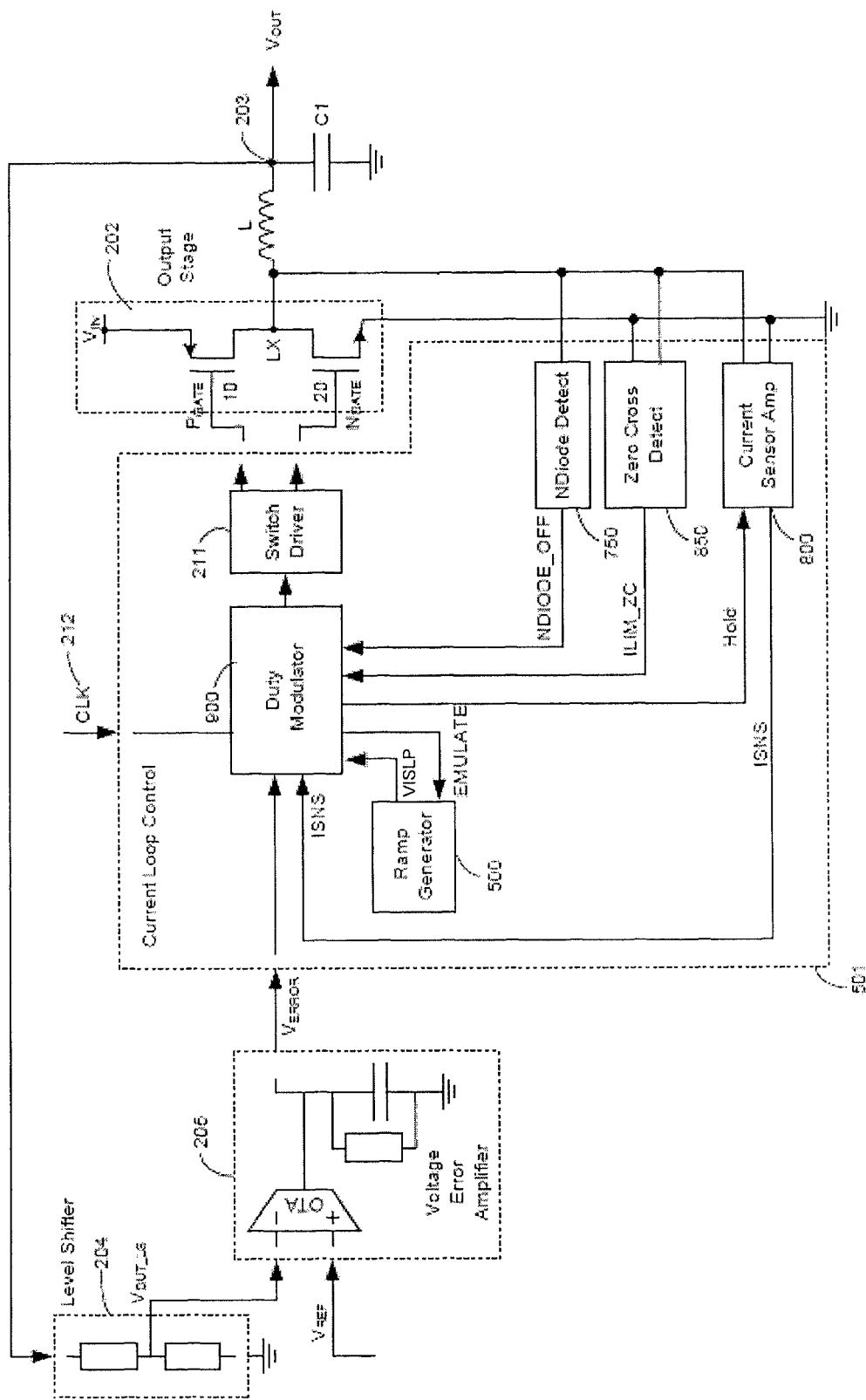
FIG. 5 shows a DC-DC converter according to an embodiment of the invention.
Figure 12:
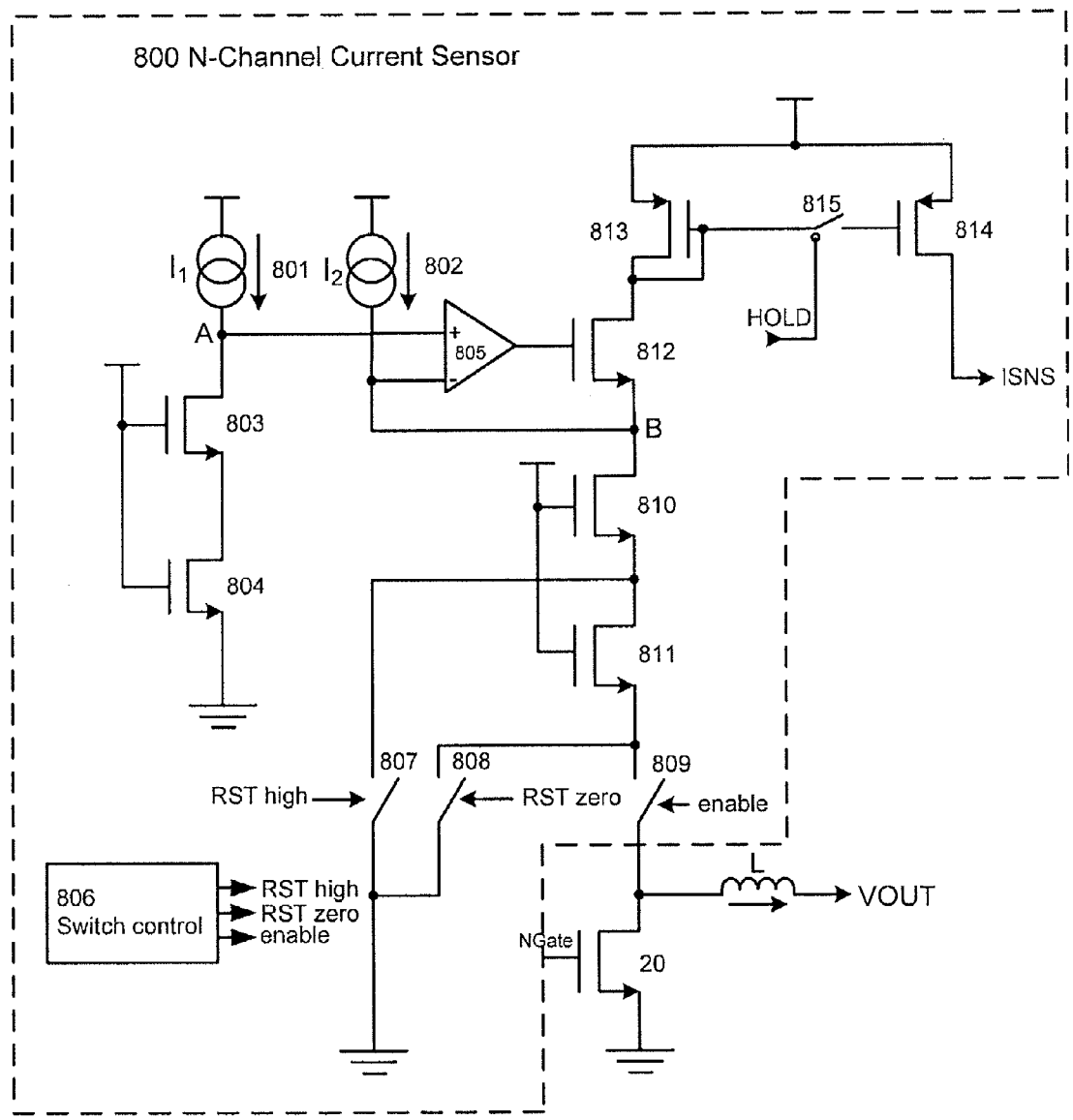
FIG. 12 illustrates one embodiment of a current sense circuit.
Figure 13:
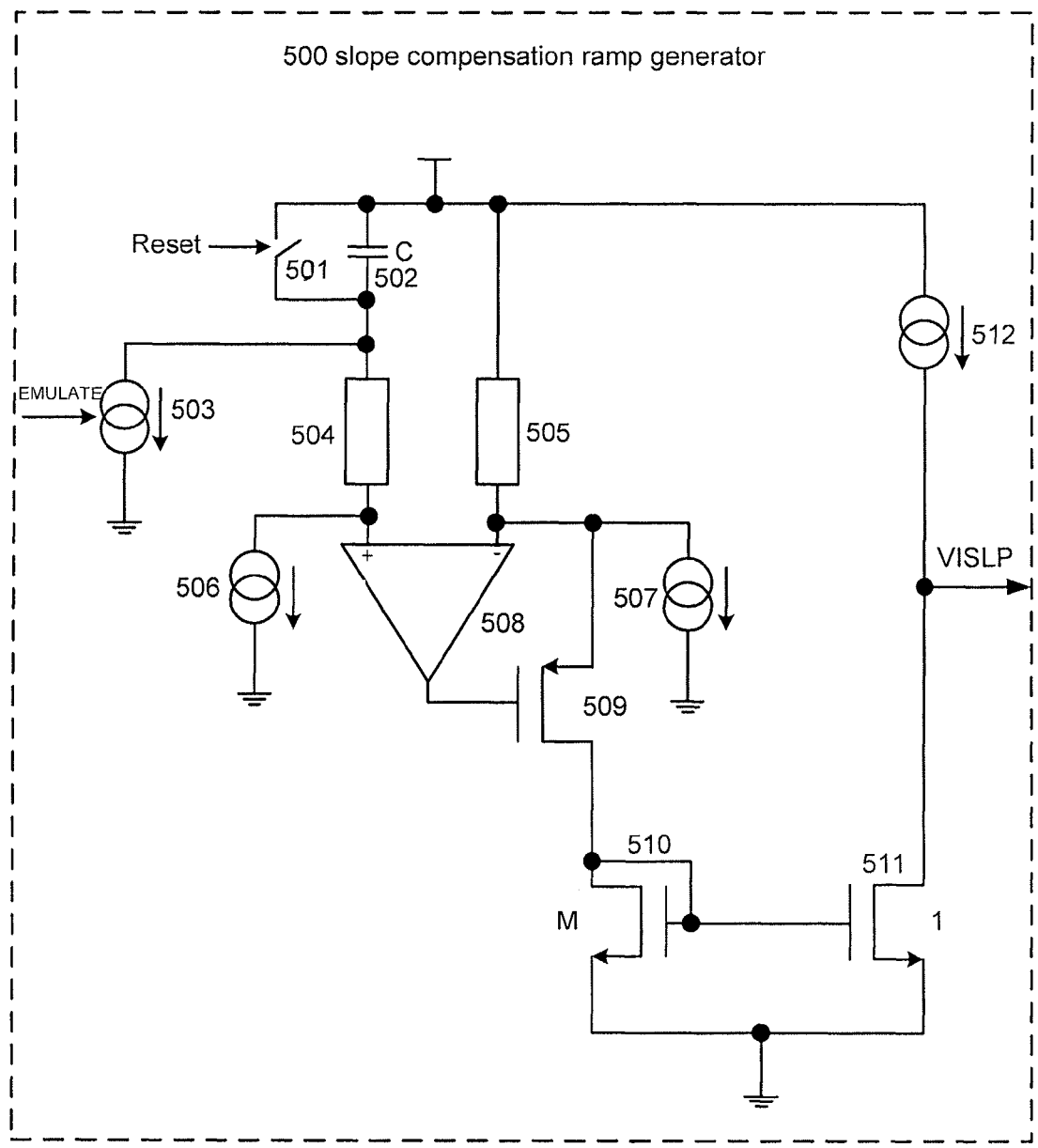
FIG. 13 illustrates one embodiment of a ramp generator capable of emulating a change in inductor current.
Figure 14:
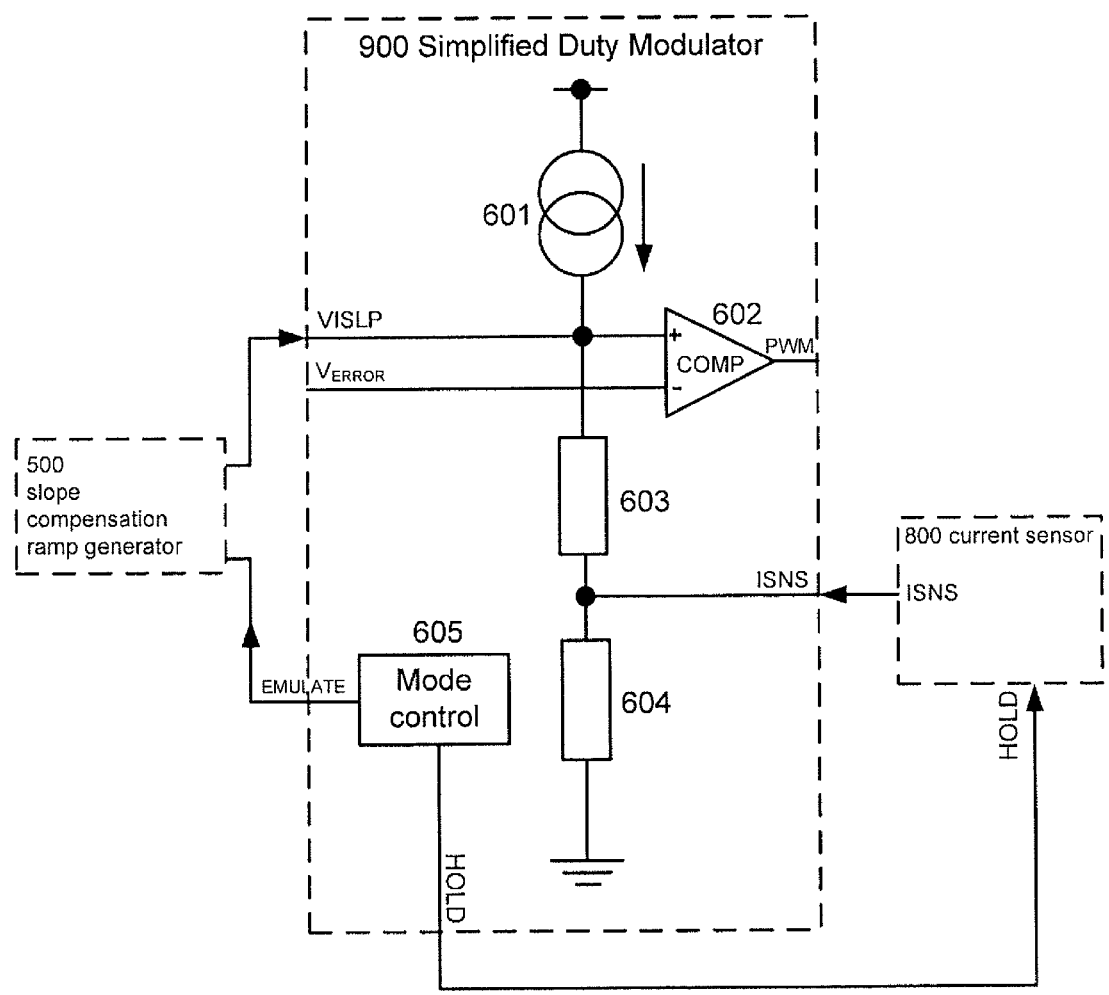
FIG. 14 illustrates a simplified embodiment of a duty modulator.

FIG. 5 shows a DC-DC converter according to an embodiment of the invention. The DC-DC converter comprises an output stage 202 coupled to an inductor L and output capacitor C1 as described above with relation to FIG. 2. The DC-DC converter also has a level shifter 204 and voltage error block 205 as described above in relation to FIG. 2. However the current loop block 501 of this embodiment comprises further elements Zero Cross Detect circuitry 850 and NDiodeDetect circuitry 750 connected to the drain of the NMOS 20. Also the Ramp Generator 500 is modified to include an optional extra slope, and the Current Sensor Amp 800 has a Hold function. Duty modulator 900 is also modified to provide the additional mode of control. The operation of these blocks will be described below. Embodiments of current sense circuit 800, ramp modulator 500 and duty modulator 900 are shown in FIGS. 12 to 14 respectively.

The operation of the circuit including inventive features will be described with respect to the operational waveforms shown in FIGS. 6 to 9, starting with operation at high load currents, and progressing through different regimes of operation at progressively lower currents. It is assumed that $V_{IN}$ and $V_{OUT}$ are constant during this sequence.

As stated above, there is now a divorce in the points in the inductor current cycle between the turn off of the NMOS power switch, and the turn on of the PMOS power switch. Ideally, the NMOS should be turned off exactly when the current through it has decayed to zero. This could be detected by monitoring when the drain-source voltage across the NMOS has fallen to zero, for instance by using a comparator. However, inevitably there will be propagation delays in comparator responding and in driving through logic and pre-driver circuitry to actually control the NMOS to turn off. Also the comparator may have a random input offset voltage.

In this embodiment of the present invention therefore a signal derived from the source-drain voltage of the NMOS is compared, by Zero Cross Detect circuitry, to a threshold level corresponding to some pedestal current level Iped. The pedestal current level Iped is chosen such that, with worst case delays and offset, the NMOS switch 20 will be effectively switched off before the current through it changes polarity. When the pedestal current limit Iped is reached the Zero Cross Detect Circuitry 850 generates a signal, ILIM_ZC instructing the Duty Modulator to turn the low-side switch 20 off. The zero cross detection circuit 850 may therefore comprise a comparator arrangement as will be understood by one skilled in the art. The comparator arrangement may be a zero crossing comparator as described in which case the pedestal level Iped is achieved by choice of an appropriate offset. It would alternatively be possible to use a comparator with zero offset, or a different offset, and compare against an appropriate threshold level.

This Iped value may be fixed by design, or may be designed to automatically alter in synchronism with say the $V_{SEL}$ signal (setting the desired output voltage) or a measured output voltage. The Iped value may be programmable to account for a specified inductor value. In general Iped may be programmable to account for variables that may alter current slew rates and thus the current headroom needed for a fixed delay time. The skilled person will be aware of how to generate a reference level equal to a desired Iped for use in the comparison circuit.

This deliberate offset in the comparator threshold introduces a zone of operation on the boundary between CCM and DCM where inductor current never quite decays to zero. Embodiments of the present invention allow current mode control to be maintained in such a zone of operation, and into full DCM which offers advantages in terms of seamless control, reduced transients and the ability to enter pulse skip mode of operation.

Transition Between CCM and DCM

Figure 6:
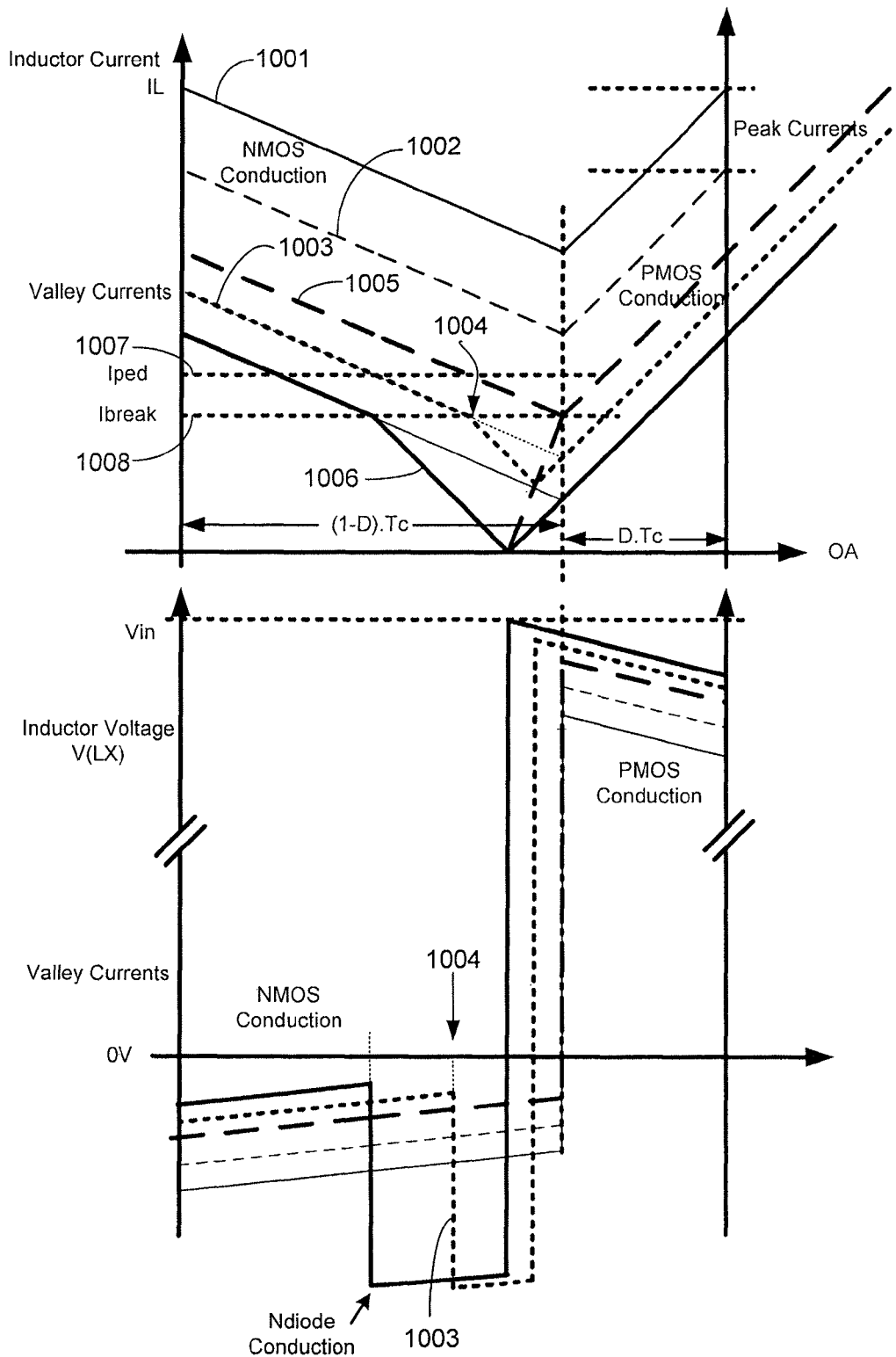
FIG. 6 shows inductor current and voltage waveforms in a DC-DC converter according to an embodiment of the invention at a level of current demand lower than that shown in FIG. 4.

To illustrate operation in this region, FIG. 6 shows a selection of inductor currents and voltages at node LX for the same $V_{IN}$ and $V_{OUT}$, as the average output current is reduced further. To account for offset voltages in the zero cross detector 850 and propagation delays before the output NMOS effectively switches, and ensure that the NMOS turns off before the inductor current reaches zero, i.e. before the NMOS drain voltage reaches zero, the current threshold level is set to a positive level, Iped, illustrated as threshold 1007 in FIG. 6. Typically this would correspond to a drain voltage of the order of a few tens of mV. As mentioned above, because of the propagation delays, the power NMOS will usually shut off a short time later and thus at a current Ibreak (line 1008) somewhat less than Iped. To a good approximation, the delays will not vary much with current, and the slope of the current waveform is a constant $V_{OUT}/L$, so the difference between Iped and Ibreak will be constant and hence Ibreak will also be constant (for inductor currents that are above Iped when the NMOS turns on—operation in the regime when the inductor current in below Iped when the NMOS turns on will be described later).

Figure 3:
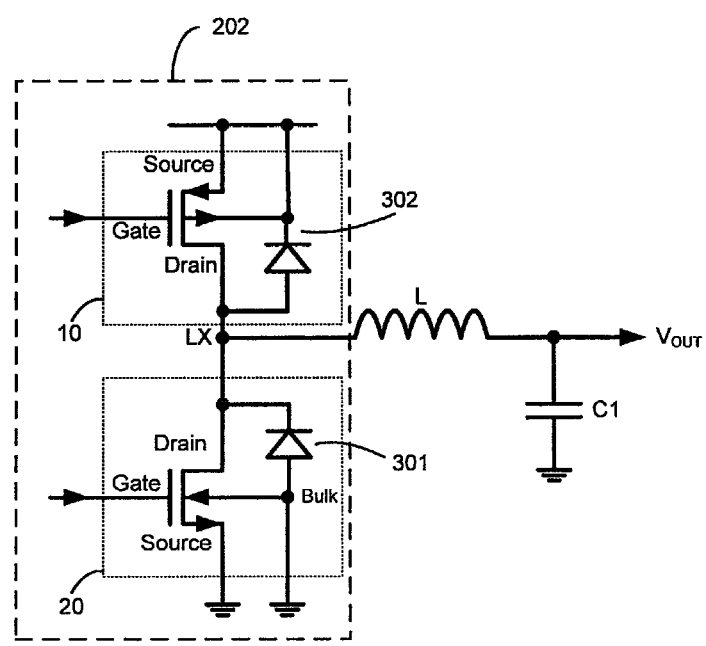
FIG. 3 illustrates the parasitic diodes associated with the switches of the output stage.

At the instant (I=Ibreak) when the NMOS effectively switches off, there will still be inductor current flowing towards the load. Since the NMOS is off, this current is forced to flow through a parallel path, such as the drain-bulk diode instead. The skilled person will appreciate that the NMOS transistor will have a parasitic drain bulk diode. FIG. 3 shows the output stage 202 of DC-DC converter with the parasitic diode 301 of the NMOS switch 20 shown as a separate parallel diode for the purposes of explanation. The PMOS switch 10 likewise has a similar parasitic diode 302.

When the NMOS device 20 is turned on, its associated parasitic diode 301 is shunted to ground by this NMOS 20 and, so long as the current through the switch 20 is not sufficient to induce an I.R drop larger than a diode's on-voltage (say 0.5V) across the parasitic diode 301, the diode 301 will not turn on. The diode 301 is however active if the NMOS device 20 turns off while there is still a current flowing from ground to the drain node: this will always be true if the current in the output filtering inductor L is flowing to the output.

When the inductor current reaches zero, the diode current will extinguish and the LX node will move from its negative voltage state, and will, if sufficient time is permitted, reach a steady-state output voltage substantially equal to that on the output voltage $V_{OUT}$. (In practice there will be some damped oscillations, not illustrated, at this transient due to stray capacitances and inductances on this node).

It should be noted that if there is a current in the opposite direction when the NMOS 20 is turned off, the node LX will fly high until it can find a sink for its current, possibly a similar body diode 302 inherent to a PMOS 10 providing the high-side drive of this output stage 202.

Whilst a low side switch such as an NMOS will have an inherent body diode associated with it, a separate diode (or other unidirectional current carrying device) could be specifically provided in parallel with the low side switch 20. Such an external diode could be provided to control current flow when the low side switch is off. This separate diode could be arranged to allow forward current to flow if the low side switch is turned off (before the PMOS is turned on) but to prevent current reversal in the inductor. Thus the diode 301 shown in FIG. 3 could alternatively be a separate external diode. Any suitable diode, preferably such as a low drop diode or Schottky diode, could be used. If required an external diode could be provided for the high side switch as well. The rest of the description will refer to a body diode or parasitic diode of an NMOS switch for clarity but it will be understood that other external diodes could be used instead.

Referring back to FIG. 6, conduction through the low side parasitic diode 301 causes a change in inductor slope from $V_{OUT}/L$ to $(V_{OUT}+\Phi)/L$ where $\Phi$ is the diode voltage. (This diode voltage will vary somewhat as the current decays, but may be of the order of 0.5V at these low currents). As described above, the break point of the slope will be at a current Ibreak largely independent of load current demand in this regime, i.e. mode, of operation.

Curves 1003 show the inductor current and voltage at node LX for operation in this mode. It can be seen that these waveforms correspond to a lower average current demand than those of 1001 and 1002 discussed above with relation to FIG. 4. During a first part of the cycle the NMOS 20 is switched on at a clock edge as described previously. During this time the node LX is near ground and the inductor current decreases with a slope of $V_{OUT}/L$. At a point during the cycle the inductor current drops to Iped which starts the process of turning the NMOS switch 20 off. Propagation delays and offset errors however mean that the switch 20 actually only turns off at point 1004 later when the inductor current has reached Ibreak. At this point the NMOS 20 is off but there is still current flowing in the inductor and so current now flows through the body diode 301 of the NMOS 20. The voltage at node LX jumps to a diode voltage below ground and current flows in the inductor with the increased slope of $(V_{OUT}+\Phi)/L$.

It will be appreciated therefore that a switch such as the NMOS 20 and PMOS 10 has various different states of operation. In an on-state the channel of the NMOS 20 (or PMOS 10) is conductive and current can flow in either direction through the switch 20 (or 10). In an off-state the channel is not conductive. However, under certain conditions current may flow through a body diode associated with the switch. Such a body diode passes current in one direction only i.e. the body diode is a uni-directional automatic switch. Once the current flow through the body diode is extinguished there is no current flow through the switch element at all. As used in this specification the terms "on" and "off", when referring to switches, refer to whether the controlled region of the switch is conducting or not. Thus, turning the NMOS 20 off refers to turning its channel region off so that no current flows through the channel region.

Having turned the NMOS 20 off, the PMOS 10 still needs to be turned on at some point. The required switching point for the PMOS turn-on can be derived graphically from the plot of FIG. 6. For a given peak current, the slope of the PMOS conduction region is $(V_{IN}-V_{OUT})/L$, that of the initial NMOS conduction region is $V_{OUT}/L$, until I=Ibreak, and then $(V_{OUT}+\Phi)/L$. The required switching point is then defined graphically. As can be seen from FIG. 6, this switching point moves to the left, denoting a higher duty cycle—physically the PMOS has to switch on longer to compensate for the higher loss of current during the phase when both NMOS and PMOS are off.

As mentioned above the use of a deliberate offset, Iped, such that the NMOS switch turns off before the inductor current reaches zero introduces a zone of operation on the boundary between CCM and DCM where the inductor current never quite decays to zero before the PMOS is turned on. The boundary of this zone is illustrated by curves 1005 and 1006. Curve 1005 represents the case where the inductor current reaches the Iped threshold but the propagation delays mean that the NMOS is turned off just as the PMOS is turned on. Curve 1006 represents the boundary where the NMOS is actually turned off and conduction through the parasitic unidirectional switch, i.e. body diode, 301 of the NMOS occurs but the inductor current only just reaches zero as the PMOS is turned on.

This mode of operation therefore represents a transitional mode between traditional CCM and DCM. This mode may therefore be referred to as a "discontinuous switching mode" as the step of switching the NMOS off is not performed as part of the same process of switching the PMOS on. The skilled person will of course appreciate that a DC-DC converter may be designed such that the NMOS always turn off before the PMOS turns on (or that the PMOS turns off before the NMOS turns on) to avoid a conduction path straight from $V_{IN}$ to ground. However such staggered switching is performed as part of the same switching process. In this mode of operation the NMOS switch is turned off as part of a separate process to the PMOS turning on as will be described.

For a continuous transition between CCM and DCM, it is desirable that the PMOS turn on still be defined by the Duty Modulator 900, i.e. by a comparison of the sensed current signal ISNS with the voltage loop error signal $V_{ERROR}$ and a ramp signal waveform, possibly with slope compensation included in the ramp signal. However, as evident from the voltage waveform, the inductor current can no longer be estimated from the NMOS drain-source voltage. The inductor current is now passing through the body diode, and the voltage jumps down to a diode voltage drop below ground.

On a normal, un-isolated n-well CMOS process, the anode of diode 301 shown in FIG. 3 will be the substrate into which all the devices are manufactured. It is thus impossible to isolate just this part of the substrate, for example to place a series resistor between the anode and ground to sense the diode current. Thus, any current passing through the diode 301 cannot be detected. An isolated process, either with extra process steps to build a junction-isolated pocket of p silicon under the NMOS, or a silicon-on-insulator technology, would allow a sense resistor between the anode of the diode and ground, probably also connected to the NMOS source to sense the total current. But as discussed above, a series resistance will cause undesirable ohmic power losses.

Rather than sense the current by monitoring the NMOS itself, a separate series sense resistor could be used. If attached to LX, this will require differential sensing that would have to recover from the large common-mode signal when the PMOS 10 is on. Again the I.R drop required to produce an adequate signal would also impair the converter efficiency. A sense resistor in series with the source terminal would be more convenient but would fail to gather at least some of the current from the drain diode, much of which would flow to substrate and guard rings rather than laterally to the source. If the converter included an external diode in parallel with the low side switch to allow unidirectional current flow after the low side switch is turned off a sense resistor could be used in a path common to both the low side switch and external diode but as mentioned above use of a sense resistor would still add an I.R drop.

The embodiment of the invention shown in FIG. 5 therefore employs a lossless approach to detecting the current flow in the inductor but still allows for current loop control when the NMOS is off and hence the current flow can not be directly detected. As shown in FIG. 5 the current sense amplifier monitors the source drain voltage of the low side supply switch 20 to derive a signal indicative of the current flow through the NMOS 20 when the NMOS 20 is on. An aspect of the circuit shown in FIG. 5 is that when the zero cross detect circuitry 850 detects that the current flow through the NMOS reaches the threshold level Iped, and the output signal ILIM_ZC becomes true, the current sensor amp, 800, is placed into a hold mode (by the derived HOLD signal shown), whereby the ISNS output current prevailing at the time that the hold signal became true is held on the ISNS output. In other words a value for the current sense signal, indicative of the inductor current, at the time just before the NMOS turns off is held as the ISNS signal after the NMOS has turned off i.e. the inductor current is effectively sampled and stored just before the low-side switch 20 turned off.

The true inductor current is then emulated by adding a component to the held ISNS value with a slope of $-(V_{OUT}+\phi)/L$, before this signal is used for comparison in the Duty Modulator 900. Practically, it is more convenient to add this slope to the ramp signal slope to get the same effect and thus, in one embodiment, ramp generator 500 comprises circuitry for adding an additional slope. This slope represents the emulated change in inductor current when the NMOS 20 is off and the change in inductor current is due to conduction through the parasitic' diode 301 of the NMOS 20. As mentioned above this ramp signal may be added to the slope compensation signal (which itself may be applied to either the ISNS signal or $V_{ERROR}$ signal) but alternatively a ramp could be applied to the ISNS current signal to produce an emulated current signal. The emulated ramp could alternatively be applied to the $V_{ERROR}$ signal. The emulated change in inductor current could be emulated by two or more ramp signals which are applied to various different signals so as to produce a combined effect which represents the change in inductor current when the NMOS is off.

The embodiment shown in FIG. 5 comprises circuitry for emulating the change in inductor current during a period when the low side switch, i.e. NMOS 20, has turned off but there may still be conduction due to the fact that the NMOS switch 20 is designed to turn off before the current reaches zero. As described above the change in inductor current may be emulated accurately taking into account the exact voltage drop across the inductor during the period when the NMOS is turned off, however a reasonable approximation to the change in the inductor current is sufficient for many converters. By emulating the change in inductor current is meant providing, by any means, a representation or replication of the change of the change in inductor current, whether exact or estimated or approximated, i.e. any means of imitating or mimicking the expected change in inductor current.

Various solutions for emulating the change in inductor current could be envisaged and could be applied in alternative embodiments. For example, in an alternative arrangement when signal ILIM_ZC goes true, indicating that the NMOS 20 is about to turn off, the Duty Modulator 900 may switch to use a different current signal which, for example, emulates not only the change in inductor current but also the absolute value of inductor current, based on a knowledge of Ibreak. However, holding a value of the current sense signal ISNS is convenient as it preserves the actual value of the signal and means that the same signals are used by the Duty Modulator 900 during the period when the NMOS 20 is on, i.e. conducting, and the period when the NMOS 20 is off, i.e. non-conducting. Also, as will be described later, at lower currents again the value of Ibreak may change depending on the starting current when the NMOS is turned on. Similarly adding a ramp signal to the slope compensation signal simply involves changing the slope of a ramp which is already applied.

As will be clear from the discussion above the change in inductor current during the period when the NMOS is off, but the NMOS body diode is passing current, has a slope equal to $-(V_{OUT}+\Phi)/L$. For simplicity, however the emulated change in inductor current may be approximated by $V_{OUT}/L$ without greatly disturbing the loop accuracy or dynamics, any error being corrected for by the voltage feedback loop. And in cases where $V_{OUT}$ is programmed, for example by a digital input signal $V_{SEL}$, this extra ramp rate may be digitally programmed by the $V_{SEL}$ signals, rather than by monitoring the output voltage directly. This avoids loading the output, making the converter more efficient, and removing the need for an electrically and physically large on-chip resistor. Any slope which approximates the actual change in inductor current may be used for the ramp but the more accurate the ramp slope the better the overall performance.

If the load current demand decreases further, eventually the real valley current reaches zero, i.e. the current through the NMOS body diode has time to decay to zero before the PMOS is due to turn on. The converter is now operating in a full DCM mode.

DCM Operation

Figure 7:
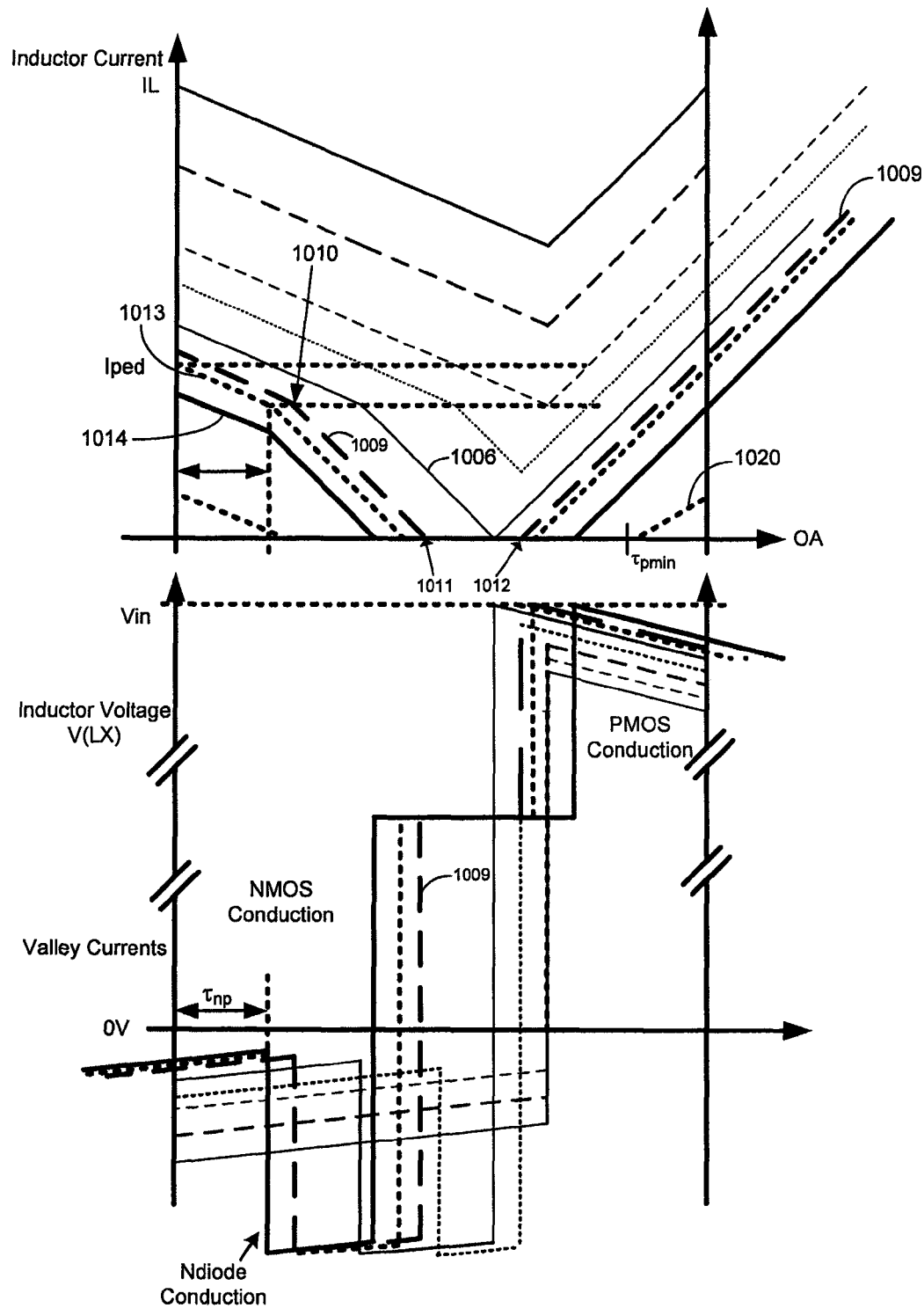
FIG. 7 shows inductor current and voltage waveforms in a DC-DC converter according to an embodiment of the invention at a level of current demand lower than that shown in FIG. 6.

Operation in full DCM is illustrated in FIG. 7. Waveform 1009 illustrates a current level where the NMOS turns off at point 1010 and the inductor current reduces to zero at point 1011 before the PMOS turns on a point 1012.

As described above, once node LX is no longer driven by either the NMOS or the PMOS, and the diode conduction stops, this node presents a high impedance to the inductor L. Ideally the node LX would just step up to a voltage equal to $V_{OUT}$. In practice the effect of parasitic inductances and capacitances on this high impedance node will result in voltage oscillations that may take some time to dampen down, but this does not affect the operation of the circuit.

The extinguishing of the inductor current is detected by the NDIODE DETECT block, 750, of FIG. 5. This circuitry monitors the voltage seen at the LX node. When the diode current extinguishes, the LX voltage starts to rise from a diode voltage below ground. When a threshold, such as zero, is met, the NDIODE_OFF signal of FIG. 5 goes true, causing the extra slope to no longer be added to the slope compensation signal. NDiode Detect circuit 750 therefore comprises a relatively simple comparator circuit as would be well understood by one skilled in the art.

At the point at which the NDIODE_OFF signal goes true the inductor current is zero and the change in the inductor current is also zero. Therefore the slope of the additional ramp signal is no longer applied. In the embodiment shown in FIG. 5 the ramp generator slope therefore changes back to the slope due to the slope compensation ramp only. The current sense signal ISNS is still maintained at the constant value held since the NMOS was switched off. Although the inductor current is now zero the change in inductor current has been added to the slope compensation signal to effectively null out the contribution from the ISNS signal and hence the ISNS signal must be maintained. Again however there are many ways in which the emulation of change in inductor current could be achieved. In other arrangements, where the additional ramp signal is applied separately the value of the additional ramp signal should ideally exactly compensate for the value of the held ISNS at the point at which the NDIODE_OFF signal goes true. It would therefore be possible to discontinue both of these signals at the same time and simply drop to a value of zero on the ISNS signal. In practice however there may be a small offset between the value of the additional ramp signal and the held ISNS signal at the point at which NDIODE_OFF goes true. A small offset will not greatly affect the current loop control and so the values of both signals may be maintained to avoid a sudden jump to zero. This will avoid possible hunting or discontinuity of operation of the feedback loop around this loop operating point, and so assist the smoothness of the transition between operational regimes.

Whilst the NMOS body diode is conducting the rate of change of the inductor current is emulated and when the NMOS body diode stops conducting, indicating that the inductor current is zero, the emulated change is inductor current is also reduced to zero. It will be appreciated that the circuitry of this embodiment of the invention therefore effectively emulates the inductor current during the whole period that the NMOS switch is off but that for part of this period the emulated current remains substantially at zero. Therefore, both zero and non-zero current may be emulated. As mentioned, due to inaccuracies in the signals produced the effective emulated current may not be exactly zero. An effective emulated current of near zero is sufficient to allow the current control loop to function correctly. In general the emulation circuitry effectively emulates a changing inductor current in a first period, when the NMOS is off and current is flowing through the body diode, and a substantially static inductor current at or near zero in a second period when the inductor current has stopped and before the PMOS turns on.

The ramp including slope compensation still continues however, and eventually causes the Duty Modulator 900 to switch the PMOS 10 back on at the time required. This operation is described in more detail later with reference to FIG. 10a.

Also, as the current demand falls, the PMOS will be switched on later and later. (Note that in full DCM mode, such as illustrated in FIG. 7, a drop in current demand leads to a reduction in duty cycle whereas in the transition phase between DCM and CCM, as illustrated in FIG. 6, a drop in current demand actually leads to an increase in duty cycle). Thus, operating in DCM a drop in current demand may lead to a shorter duty cycle and a shorter period during which the PMOS is turned on.

However there is a minimum feasible pulse width for control of the PMOS switch and thus a minimum period in which the PMOS switch may be operational. This means that there is a minimum charge that may be passed by the PMOS each cycle. If current demand falls even further, then this minimum charge passed by the PMOS each cycle may be more than required by the load, so the output voltage would continue ramping up.

Pulse Skip Mode

In an embodiment of the present invention therefore a minimum conduction period $\tau_{pmin}$ is defined for the PMOS, to give the PMOS time to turn on before reaching the clock edge where it must turn off. If the desired duty cycle reduces such that PMOS on time would be below this minimum conduction period the PMOS is prevented from turning on until the output voltage $V_{OUT}$ has drooped enough to require recharging.

Thus, in this embodiment of the invention, a Pulse-Skip mode is enabled, not with an error voltage threshold or with an average current, but rather with this predetermined minimum power PMOS switch conduction period limit $\tau_{pmin}$.

A pulse skip mode of operation is thus advantageous in that it allows operation at low current demands. Pulse skip mode is also advantageous in that any switching losses associated with switching the power switches 10 and 20 are avoided whilst skipping pulses. This can avoid significant losses associated with operation of the converter herein illustrated and thus improve the efficiency of the converter at low current demands.

If the PMOS conduction period would be less than $\tau_{pmin}$ in any particular DCM clock cycle, then the power PMOS switch conduction period is omitted in that particular cycle. While PMOS pulses are suppressed, the output voltage will sag, forcing the error voltage, $V_{ERROR}$, to rise eventually. The current, previously sampled by the current sensor block 800 at the last NMOS conduction period, is still held, the slope compensation is still active, and the loop will eventually recover normally by turning on the power PMOS switch 10 for a time greater than $\tau_{pmin}$. The PMOS switch will be turned on at a time defined as normal by the Duty Modulator based on the previously sampled current, the current slope compensation ramp, and the error voltage $V_{ERROR}$. This regime of operation is very much under voltage-mode control but this does not matter since it is guaranteed that the output current waveform is discontinuous, so the normal double-pole response from an inductor and capacitor filter so characteristic of voltage mode CCM, drops to a single pole response.

FIG. 7 shows a current waveform 1020 that would be suppressed by the pulse skipping.

It will be clear that in order to implement this embodiment of the invention one needs to determine the duration that the PMOS will be on for, prior to turning the PMOS on or not.

This duration, in VCM, corresponds to time between the current signal reaching the threshold level and the next clock edge turning the PMOS off, i.e. the start of the next cycle. The duration may be determined by monitoring the time between the last clock edge, i.e. start of the current cycle and the threshold being reached and determining the remaining cycle time based on a knowledge of the cycle frequency.

In a preferred embodiment however the system clock is delayed by an accurate delay. Thus the external clock signal 212 is delayed by a fixed delay, greater than or equal to the minimum PMOS conduction period, before being used to control the switching of the PMOS and NMOS. A signal derived from the undelayed clock signal can then be used to control timings. For example if the system clock is delayed by a period P and the minimum PMOS conduction period is $\tau_{pmin}$ then, if the switch control signal is generated before a time $T_1$, where $T_1 = P - \tau_{pmin}$, after the undelayed clock edge, the PMOS is switched on whereas as the switch control signal is generated after $T_1$ the pulse is skipped.

The apparatus may therefore comprise a delay means for delaying the clock edge used for switching by a known delay and a timer circuit which operates based on an undelayed (or less delayed) clock edge. The timer circuit may assert a no_switch signal a certain time after the undelayed clock edge until reset by the delayed clock edge. In this way the no_switch signal is asserted for the period of $t_{pmin}$ before the delayed clock edge. Turn on of the PMOS is inhibited when the no_switch signal is asserted.

Figure 16:
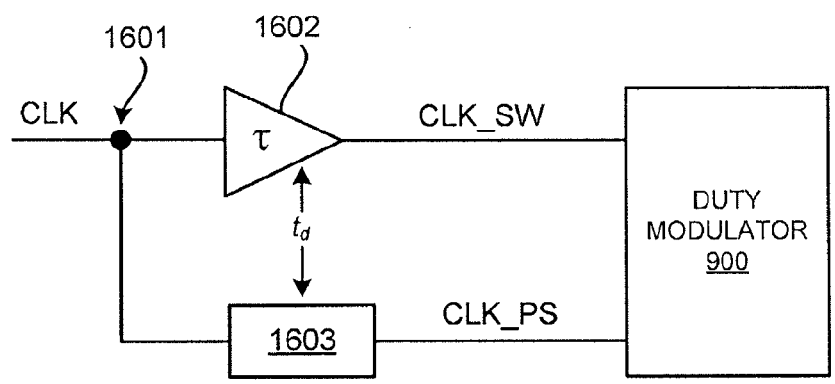
FIG. 16 illustrates one embodiment of a circuit arrangement for implementing pulse skip operation.

FIG. 16 illustrates one embodiment of a circuit arrangement that may be used to implement a pulse skip mode of operation. This circuit may form part of the Duty Modulator 900 shown in FIG. 5 or it may be a separate circuit for supplying signals to the Duty Modulator. A master clock signal CLK is received at an input 1601. This signal is input to delay element 1602 to produce a delayed version of the clock signal. One delay element 1602 is shown in FIG. 16 but more than one delay element may be used. The delay element 1602 delays the master clock signal by a period $t_d$. The delayed signal CLK_SW is used as the master switching clock in the state machine of the Duty Modulator. A pulse generator (not shown) may be located before or after delay element 1602 to ensure that the delayed clock signal has a clock pulse with a desired pulse width, for example 20 ns or so. The master CLK signal is also received by a pulse generator 1603 which generates a pulse skip signal CLK_PS. Pulse skip signal CLK_PS goes high in response to the rising edge of the master clock pulse and remains high for a period at least equal to $t_d$. Preferably pulse skip signal CLK_PS has a pulse width greater than $t_d$ so that it overlaps with the CLK_SW signal to avoid glitches. For example the CLK_PS signal may remain high for a period equal to $t_d$ plus the duration of the pulse of the delayed clock signal.

The CLK_PS signal is received by another part of the Duty Modulator circuit which is arranged so that the PMOS switch can not be turned on whilst the CLK_PS signal is high. Thus, for a period of time before the start of the next cycle (as defined by the CLK_SW) signal the PMOS switch is inhibited from being turned on. The duration of this period, $\tau_{pmin}$, is effectively set by $t_d$ and any propagation delays inherent in the logic. Ignoring propagation delays the period $\tau_{pmin}$ is equal to the delay duration $t_d$. The delay duration may be set according to the frequency of operation of the converter.

It will be appreciated that other clock signals may be derived from the master clock, for instance a reset clock signal for resetting various logic blocks and/or one or more clock signals used to clock various logic block, flip-flops etc. However only the signals directly relevant for pulse skip are shown for clarity.

Figure 8:
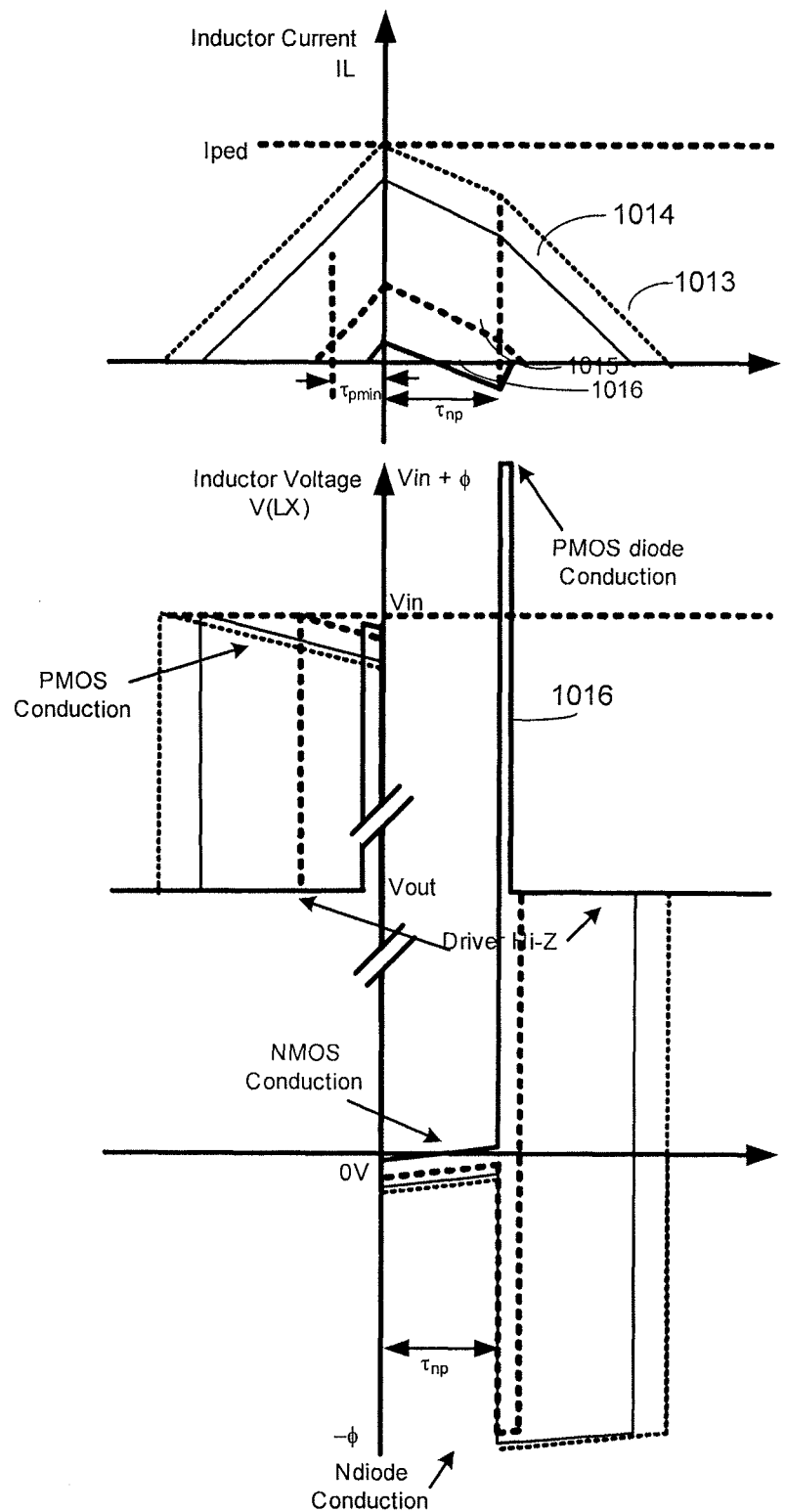
FIG. 8 shows inductor current and voltage waveforms between cycles.

As the current demand falls even further, the current through the NMOS will decay below the threshold Iped earlier and earlier. FIG. 8 shows waveforms for lower current levels, but with the time axis shifted half a period to focus on the region of interest. Also the relative slopes of the charging and discharging of the inductor have been changed, with a slower PMOS slope, representing a smaller $V_{IN} - V_{OUT}$ relative to $V_{OUT}$, to illustrate a problem of operation.

As discussed previously there is a propagation delay $\tau_{np}$ between when the sensed current passes the Iped threshold and when the NMOS actually turns off. So in the case of a current that is exactly Iped when the PMOS turns off and NMOS turns on, as illustrated by waveform 1013, the NMOS will be kept on for a time $\tau_{np}$ turning off at Ibreak. Also the sensed current is preset high before the PMOS/NMOS transition and the comparator of the Zero Crossing Detect circuit is reset, so even if the current at the PMOS/NMOS transition is less then Iped, as shown by waveform 1014, the NMOS will still be kept on for a time $\tau_{np}$. So the sensed current when the NMOS turns off will decrease below the previous value of Ibreak, rather than stay constant. Thus the current decays initially at a slope $V_{OUT}/L$ until time $\tau_{np}$ and then, as the output node jumps to a diode voltage drop below ground, decays at $(V_{OUT} + \Phi)/L$ until decayed to zero.

The PMOS then turns on at the appropriate time before the next cycle starts to give a steady state peak current and hence the required average output current to the load. As above, the turn-on is still under control of the Duty Modulator 900, with the sensed current sampled and held corresponding to Ibreak (with Ibreak now decreasing) and with the emulated slope added during the diode conduction period. If the current demand were to decrease further then the PMOS would turn on later, eventually getting into the pulse-skip mode as discussed above.

However, as shown in the solid curve 1016 in FIG. 8, at very low average output currents, when the power NMOS switch 20, is forced on for its minimum $\tau_{np}$, the condition will eventually be reached when the inductor current is zero or negative by the end of the NMOS conduction period, i.e. the NMOS will start to sink current from the load. When the NMOS eventually turns off, the inductor will still require current in this direction, so node LX will fly high until being caught by the PMOS body diode 302, which will then pass this current. The current will decay, at a rate $(V_{IN} + \Phi - V_{OUT})/L$, to zero, whereupon the driver output will become high impedance and the output will fall to $V_{OUT}$, albeit probably with some voltage oscillation in a real circuit. This voltage spike is undesirable per se, but more importantly this activity will waste power, first in unnecessary dissipation in the NMOS and the NMOS taking power away from the load, then in power loss in the PMOS body diode. In detail, on an n-well CMOS process, the PMOS "diode" will actually act as a vertical pnp transistor, with the drain as the emitter and $V_{IN}$ as the base, and the substrate as collector, so that much of the diode current will flow to substrate through a voltage drop of VIN+Φ, which is much larger than just the diode drop Φ. Also there is the possibility that the NMOS channel current can cross zero early enough for the subsequent flow of charge from the load to actually be equal or greater than the charge supplied to the load earlier in the cycle, i.e. to actually fail to charge the load at all.

The outer loop would eventually compensate for these effects, but the reverse current through the NMOS would disadvantageously cause extra power losses.

Furthermore the loop might not be able to operate in a pulse-skipping mode in these conditions, so the power saving possible by pulse-skipping would not be realised. Under some conditions of $V_{IN}$ and $V_{OUT}$ as the current demand falls the condition described above, where the minimum NMOS conduction time would result in a negative current flow in the inductor, may occur before the duty cycle has reduced to less than the defined minimum PMOS conduction time $\tau_{pmin}$, i.e. before pulse skip mode has been entered. This power wastage may keep the current demand required sufficiently high that the duty cycle is always above the PMOS minimum conduction time. Thus pulse skipping mode would not be entered.

Diode Mode

To avoid this problem, in one embodiment of the invention the DC-DC converter is operable in a mode, which may be termed a "diode mode", where after the PMOS switches off, the current is carried by the NMOS body diode (which will automatically shut off when it becomes reverse biased) rather than by the NMOS channel (which can conduct in both directions). In other words, rather than operate such that the NMOS is always turned on after the PMOS has been turned on, in diode mode the PMOS may be turned off and the NMOS maintained in an off state such that any current is conducted via the body diode only. As mentioned above an NMOS has an inherent body diode but a separate external diode, or other unidirectional switch element, could be provided in parallel with the low side switch instead. In this diode mode the PMOS may be turned on when the (emulated) current signal crosses the $V_{ERROR}$ threshold (as modified with a slope compensation ramp) in a first cycle and then again in a subsequent without the NMOS being turned on in between. This diode mode of operation may occur for several successive cycles.

In principle, the NMOS could be turned off as soon as the current crosses zero. But, due to the same propagation delay and offset issues described above, the NMOS would only actually turn off after a delay similar to $\tau_{np}$—which would be too late.

One embodiment of the invention therefore detects whether the current has reversed, i.e. crossed zero, during one cycle, and, if so, forces the NMOS off in the next cycle. In other words a negative current is detected in one cycle and such detection prevents a negative current situation from re-occurring in the next cycle. Following such detection, the NMOS may be inhibited from turning on at the next clock edge. However by then there has already been one cycle with undesired behaviour. Further, such an arrangement requires a detection of current flow in the NMOS. Thus the NMOS has to be on in one cycle so that the diode mode can be instigated for the subsequent cycle. In an extreme case this could lead to the undesired behaviour every other cycle.

Figure 9:
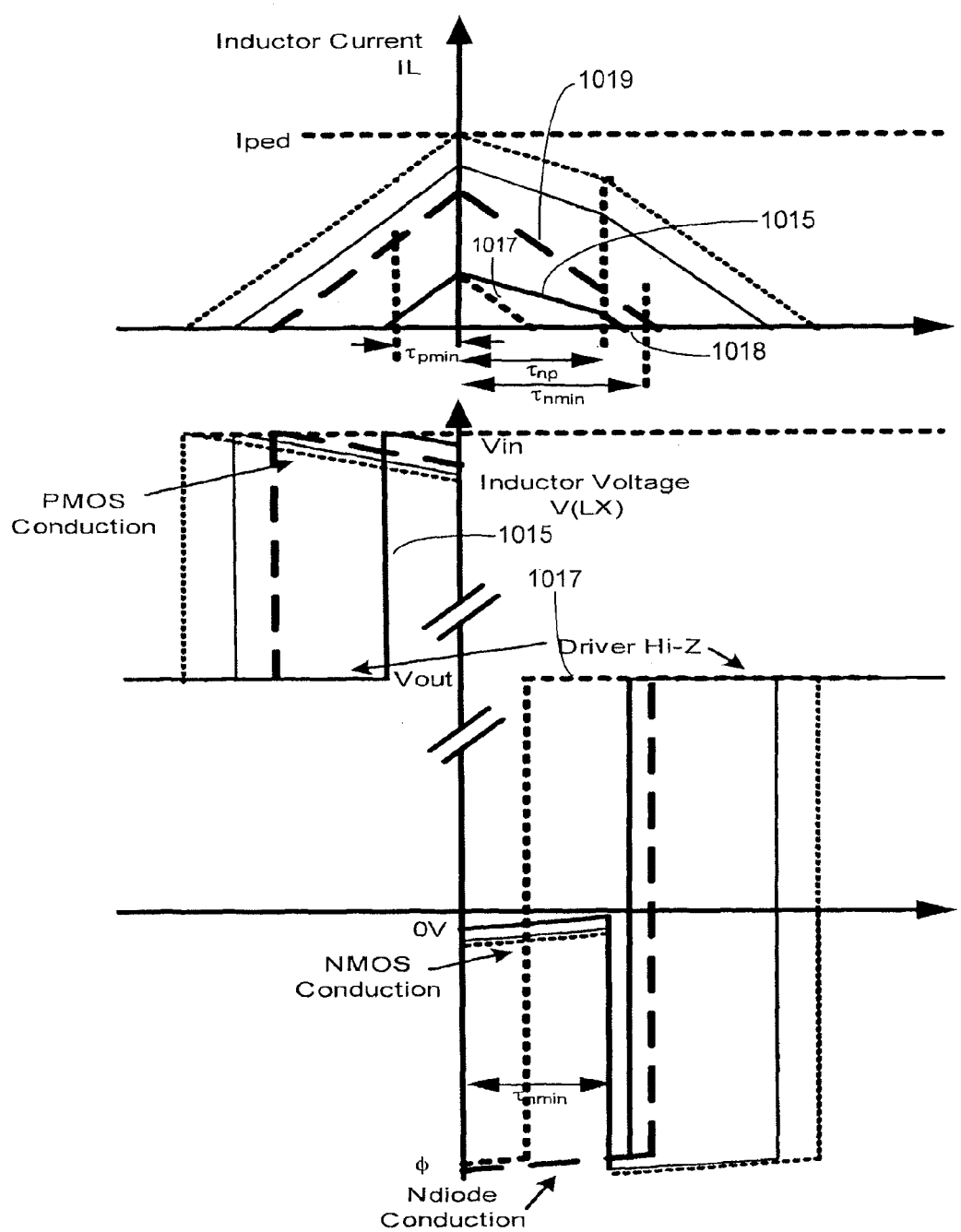
FIG. 9 shows current and voltage waveforms illustrating a mode of operation at low current demand.

In a preferred embodiment a minimum NMOS conduction time threshold, $\tau_{nmin}$, that is somewhat longer than $\tau_{np}$, is defined. If the current reaches zero before this extended time, then the control circuitry forces the NMOS not to turn on the next cycle. This is illustrated in FIG. 9. Solid curve 1015 illustrates a waveform at a low current demand. The initial part of the curve shows the PMOS on phase where the inductor current increases. At the next clock edge the PMOS turns off and the NMOS turns on. The current in the NMOS is already less than Iped but the propagation delays mean that the NMOS does not turn off until the end of period $\tau_{np}$. At this point the inductor current is still positive and so diode conduction occurs until the inductor current reaches zero at point 1018. The point at which the diode current reaches zero is less than the defined minimum conduction period, indicating that the current demand is close to the limit where the minimum NMOS on time, $\tau_{np}$, may lead to a negative current. Hence the converter enters diode mode and inhibits the NMOS from turning on in a subsequent cycle. In this subsequent cycle the PMOS may still turn on at the same time and hence the first part of curve 1015 would be repeated. However the NMOS would be prevented from turning on at the next clock edge. Thus in this cycle, the drain-bulk diode of the power NMOS switch sources the current set up in the inductor by the PMOS. As described previously this slew rate will be higher, ($V_{OUT}$+ $\Phi$)/L rather than $V_{OUT}$/L, so the current will decay even earlier, as shown by curve 1017 which represents the current and voltage waveforms in diode mode.

The system remains in this mode until the current demand increases or the PMOS current recovers enough to drive the zero-cross point past $\tau_{nmin}$ (illustrated by dashed curve 1019) after which the previous mode of operation will resume. As mentioned, when operating in diode mode, the slope of current decrease is greater than in non-diode mode. It can be seen therefore that there is an inherent degree of hysteresis in entering and exiting diode mode in that the peak inductor current required to enter diode mode is lower than the peak inductor current to exit diode mode. It will, of course, be appreciated that once operating in diode mode, as the current decays more quickly than in non-diode mode operation, the converter may need to slightly increase the charge supplied during the PMOS conduction time to compensate.

By setting a conduction time threshold which is longer than the minimum propagation delay $\tau_{np}$ this embodiment of the present invention pre-empts the undesired behaviour. If the NMOS is on for a duration in one cycle which is less than a time threshold (i.e. the defined duration $\tau_{nmin}$)—but which is greater than the minimum propagation time $\tau_{np}$—there will be no reverse current but the next cycle the NMOS will not turn on. The use of diode mode guarantees that pulse skip mode can be entered when appropriate.

It should be noted that in diode mode the turn on of the NMOS is inhibited in a subsequent cycle. The inhibition could be applied in the very next cycle. However, if in the next cycle the converter enters pulse skip mode there will be no current flow in the inductor at all in the next cycle. In such a case the diode mode preferably inhibits the NMOS from turning on after the next time that the PMOS has been on. In other words, if the inductor current reaches zero in a time period shorter than $\tau_{nmin}$ in a time period, the NMOS is inhibited from turning on at the clock edge following the next time that the PMOS has been switched on. It is preferable to maintain diode mode until the PMOS has been on to prevent diode mode being missed. Alternatively, diode mode may only apply to the very next cycle but if the converter has been operating in a pulse skip mode it could be arranged such that the first cycle where a pulse in not skipped (following a skipped pulse) is operated in diode mode automatically. In other words it may be assumed a converter exiting pulse skip mode will need to be operated in diode mode.

Figure 15:
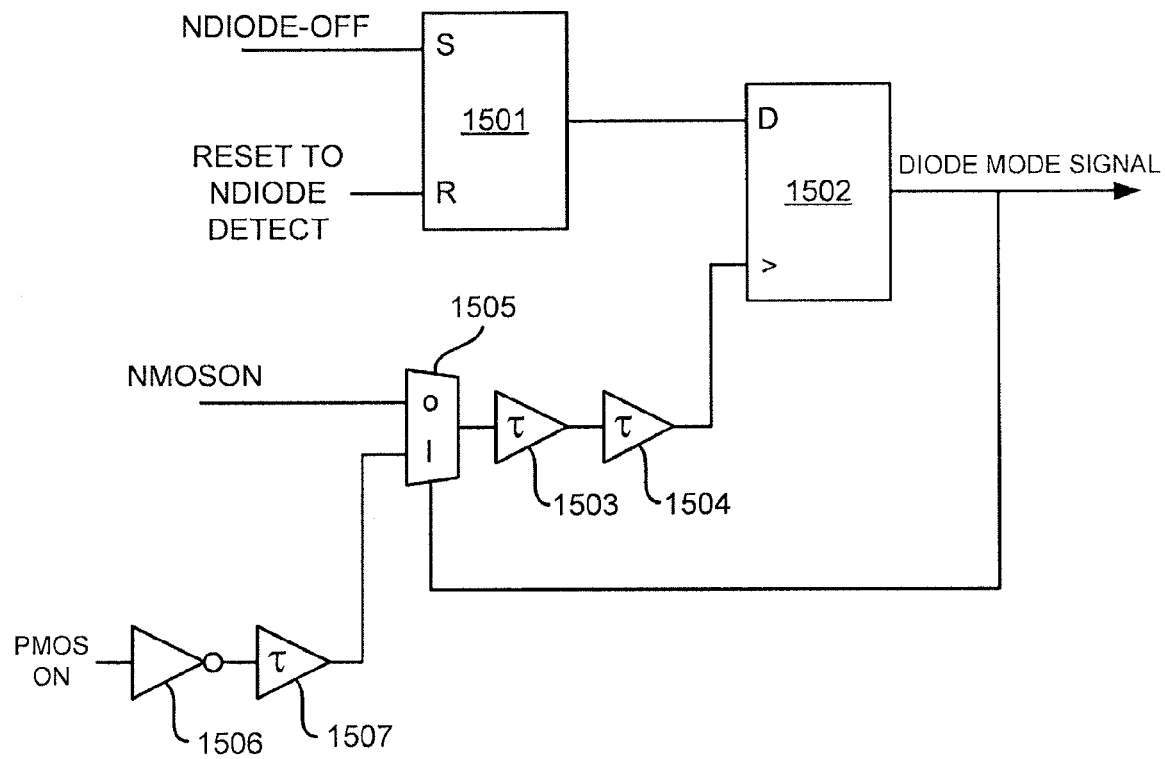
FIG. 15 illustrates one embodiment of a circuit arrangement for implementing diode mode of operation.

FIG. 15 illustrates an embodiment of a circuit arrangement, which may for example be implemented within Duty Modulator 900, for implementing diode mode. The circuit arrangement samples the NDIODE_OFF signal every cycle at a period effectively equal to $\tau_{nmin}$ to determine whether or not the inductor current has reached zero. The NDIODE_OFF signal is input to a latch 1501 which latches when the NDIODE_OFF signal goes true, i.e. the output from the comparator indicates that the voltage at Node LX reaches zero. The latch 1501 rejects oscillations on node LX after the conduction of the NMOS body diode has ended. Although shown as part of the diode mode circuit the latch 1501 could be implemented within the NDIODE Detect circuitry. Latch 1501 is reset by a reset signal sent to the NDIODE detector comparator. The output of latch 1501 is provided to D type flip flop 1502 and sampled at an appropriate clock edge. The clock edge is derived from the NMOS ON signal, which is derived from feedback from the switch driver, passed through delays 1503 and 1504. Two delays are shown in FIG. 15 for explanation purpose but a single delay or more than two delays may be used to provide the correct delay. Delay 1503 provides a delay which effectively provides a delay matched to the zero cross comparator and NMOS switch off time, i.e. the minimum conduction time of the NMOS. Delay 1504 provides a delay to allow for delays in the NDIODE detect comparator and logic in generating the NDIODE_OFF signal.

When the delayed clock edge is received by D type flip flop 1502 the state of the latched NDIODE_OFF signal is sampled. If the output is false, this means that inductor current has not yet reached zero and diode mode is not initiated. If the output is true this means that the inductor current reached zero in a time less than $\tau_{nmin}$ and Diode Mode is enabled. The output of the flip flop 1502 therefore comprises a diode mode signal which is used by the Duty Modulator to determine whether or not to inhibit turn on off the NMOS at the start of the next cycle.

It will be appreciated that in Diode Mode the NMOS is not turned on and so the feedback from the NMOS switch driver can not be used. In this instance an appropriate signal is created. The PMOS ON signal is inverted by inverter 1506 and delayed by delay 1507 by a delay corresponding to the delay between switching the PMOS off and switching the NMOS on. The result is a signal that goes high at the time that the NMOS would have turned on were the circuit not in Diode Mode. This signal is selected by multiplexer 1505 responsive to the Diode Mode Signal output.

It should be noted that diode mode has been described in relation to Valley Current Mode control of a DC-DC converter. However the principle of diode mode is equally applicable to a Peak Current Mode controller. In Peak Mode Control, the PMOS is turned on at a clock edge and is turned off when the current reaches the threshold. At this point the PMOS is turned off and the NMOS is turned on. To prevent power wastage, as described above, it may be preferred to switch the NMOS switch off before the current goes negative. However, as described above there will again be propagation delays and offsets associated with any comparison circuitry and hence there will be a minimum effective NMOS on time. Thus the minimum period $\tau_{nmin}$ may be defined as described above and if, in any cycle, the NMOS current reaches zero in a duration less than $\tau_{nmin}$ the NMOS may be inhibited from turning on in a subsequent period.

The operation of the embodiments of the present invention is now described including more detail of the Current Loop block and waveforms therein rather than focussing on the output waveforms.

Figure 10A:
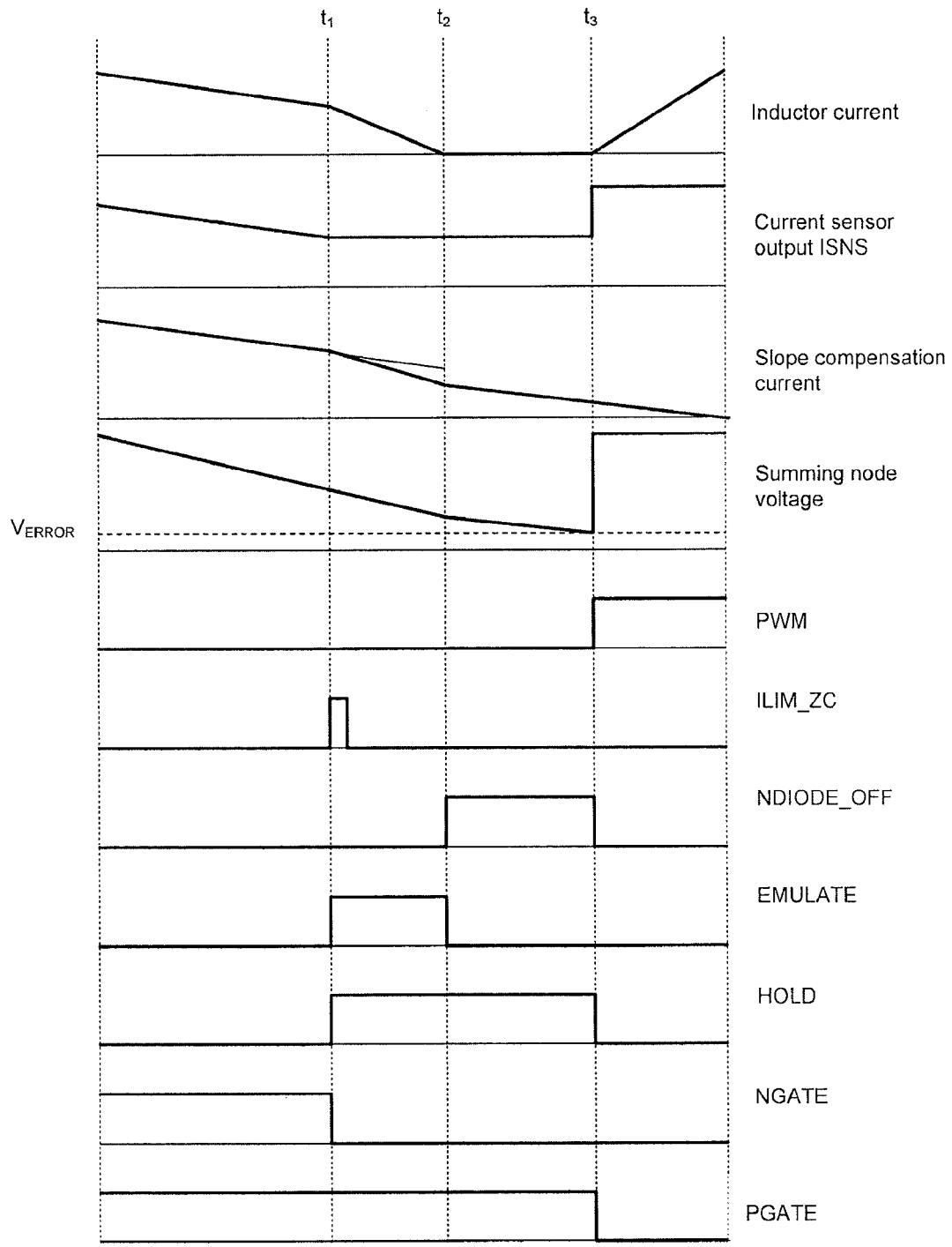
FIG. 10a illustrates various control waveforms of an embodiment of a DC-DC Converter operating in DCM.

FIG. 10*a* shows the control signals in detail when the DC-DC converter is operating in full DCM mode, as described above with relation to FIG. 7.

The first trace shows the inductor current, similar to the current curve shown in FIG. 7, with a first phase, to time t1, of decay with a slope of $V_{OUT}/L$ when the NMOS is ON, a steeper slope of $(V_{OUT}+\Phi)/L$ as it passes through the NMOS body diode until the current decays to zero at t2, a third phase of zero current, until t3, when the PMOS is turned on.

The second trace shows the sensed current, processed by the block 800. Initially this follows the droop of the inductor current, until it drops to Ibreak, where it is held constant. Once the PMOS turns on, the sensed current output is set to a higher value to ensure that it is well above the Iped threshold during any transient when it is enabled as the PMOS turns off and the NMOS turns on.

The third trace shows the current due to slope compensation plus additional ramp. This starts of with a slope equivalent to $(V_{IN}-V_{OUT})/L$ but increases in slope by nominally $(V_{OUT}-\Phi)/L$ between t1 and t2 to emulate the increase in slope of the actual inductor current. This extra slope is removed after the current goes to zero at t2.

The fourth trace shows the voltage at an internal summing node, where the ISNS and the slope compensation current are summed. The PMOS turns on when this crosses $V_{ERROR}$. Note the voltage loop will slowly settle to an appropriate $V_{ERROR}$ value to generate the correct voltage after any change in load current demand.

The remaining traces are the control signals. PWM is an internal node pulsed high after the summing node voltage crosses $V_{ERROR}$, and reset by the edge of external clock CLK. ILIM_ZC gives a triggering pulse when the NMOS current crosses the pedestal threshold Iped, as determined by Zero cross detect circuit 850. This sets the EMULATE signal which is the signal to add the additional ramp to the generated slope compensation to emulate the change in inductor current. EMULATE is reset by the NDIODE_OFF signal generated by the NDiode detect block 750 which senses the output voltage passing from negative to positive when the body diode stops conducting. The NDIODE_OFF signal is itself reset when the PMOS is turned on. HOLD is a combination of EMULATE and NDIODE_OFF and is used to cause the current sensor block 800 to hold the sensed current value. NGATE and PGATE are the drive signals for the NMOS and PMOS gates.

Figure 10B:
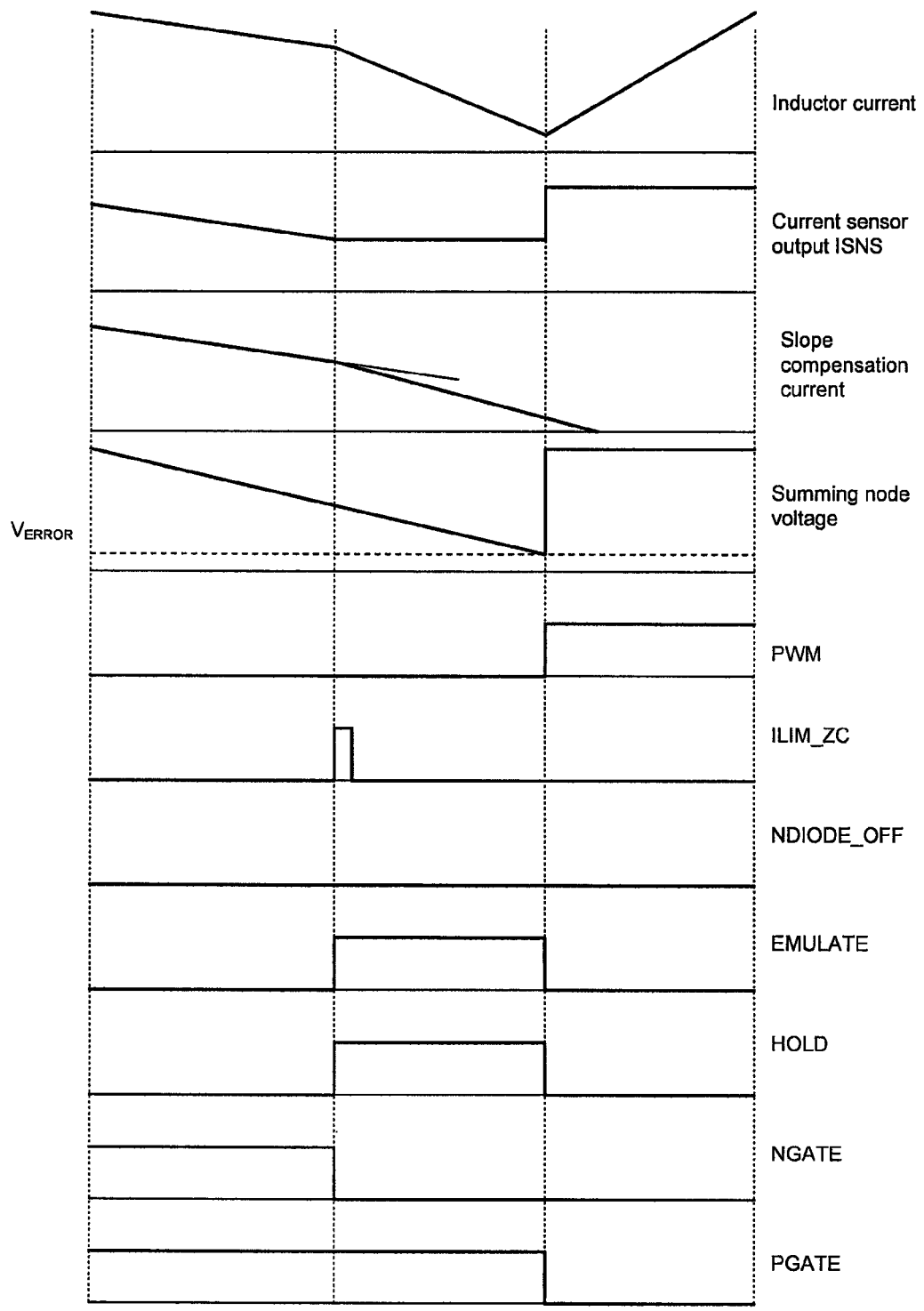
FIG. 10b illustrates various control waveforms of an embodiment of a DC-DC Converter operating in a transitional mode between CCM and DCM.

FIG. 10*b* shows operation in the transition phase between CCM and DCM operation, in conditions similar to those of the dotted curve in FIG. 6, where the actual valley current is above zero but below Iped and Ibreak. The same signal traces are shown as in FIG. 10*a*.

The control scheme has to incorporate the current control loop in this region since the inductor current has not decayed to zero and the overall loop would be intrinsically second-order in nature without some current information to compensate it.

Unfortunately, the current sensor, 800, cannot supply any current information if the power NMOS switch 20 is off. Instead, the current information is emulated by sampling the current prevailing in the sensor during the time when the switch is turned off, and is supplemented by the additional emulated current ramp while the drain-bulk diode 301 is conducting.

Operation is similar to the true DCM above except that the actual inductor current never decays to zero, so NDIODE_OFF is never triggered, and so the extra slope compensation ramp is still applied when the summing node voltage passes $V_{ERROR}$. Also the net effect of this emulation is that the overall inductor current ramp plus slope compensation ramp—to first order—is identical to that prevailing in CCM where the average inductor current is high enough so that the zero cross detection circuit never trips. The transitions between full CCM, CCM under NMOS diode conduction, and DCM are therefore smooth.

The embodiments of the present invention therefore provide a DC-DC converter operable in valley current mode and operable in a number of different modes. The use of the different modes allows the DC-DC converter to maintain accurate current mode control in CCM, and through a transitional phase to full DCM. In the transitional phase, although the NMOS is turned off the current loop is still active and current loop control is provided by emulating the change in inductor current. This embodiment of the present invention therefore provides seamless transfer between CCM and DCM and vice versa. The control mechanism uses a lossless current sensing approach and thus losses associated with a series sense resistor are avoided. The DC-DC converter may operate a fixed frequency in CCM, the transitional phase and DCM—although variable frequency operation may be implemented if desired. A pulse skip mode is also available which allows for significant efficiency gains at low current demands by preventing switching when unnecessary and thus reducing the relatively switching losses. A diode mode of operation may be used at low current demands to guarantee that pulse skip mode will be entered. These modes of operation are automatic in operation (if enabled). The onset of the transitional phase is set by the value of Iped and the converter will automatically operate in CCM, transitional phase or DCM depending on the load current. If the minimum conduction time periods are enabled the converter will also automatically enter pulse skip and/or diode mode as appropriate and the transition between modes will be automatic and continuous, i.e. the control method is the same between all modes and there is no change from one set of control signals to another. The control loop is maintained in each of CCM, the transitional phase, DCM and pulse skip, even though no current information may be available.

Figure 11:
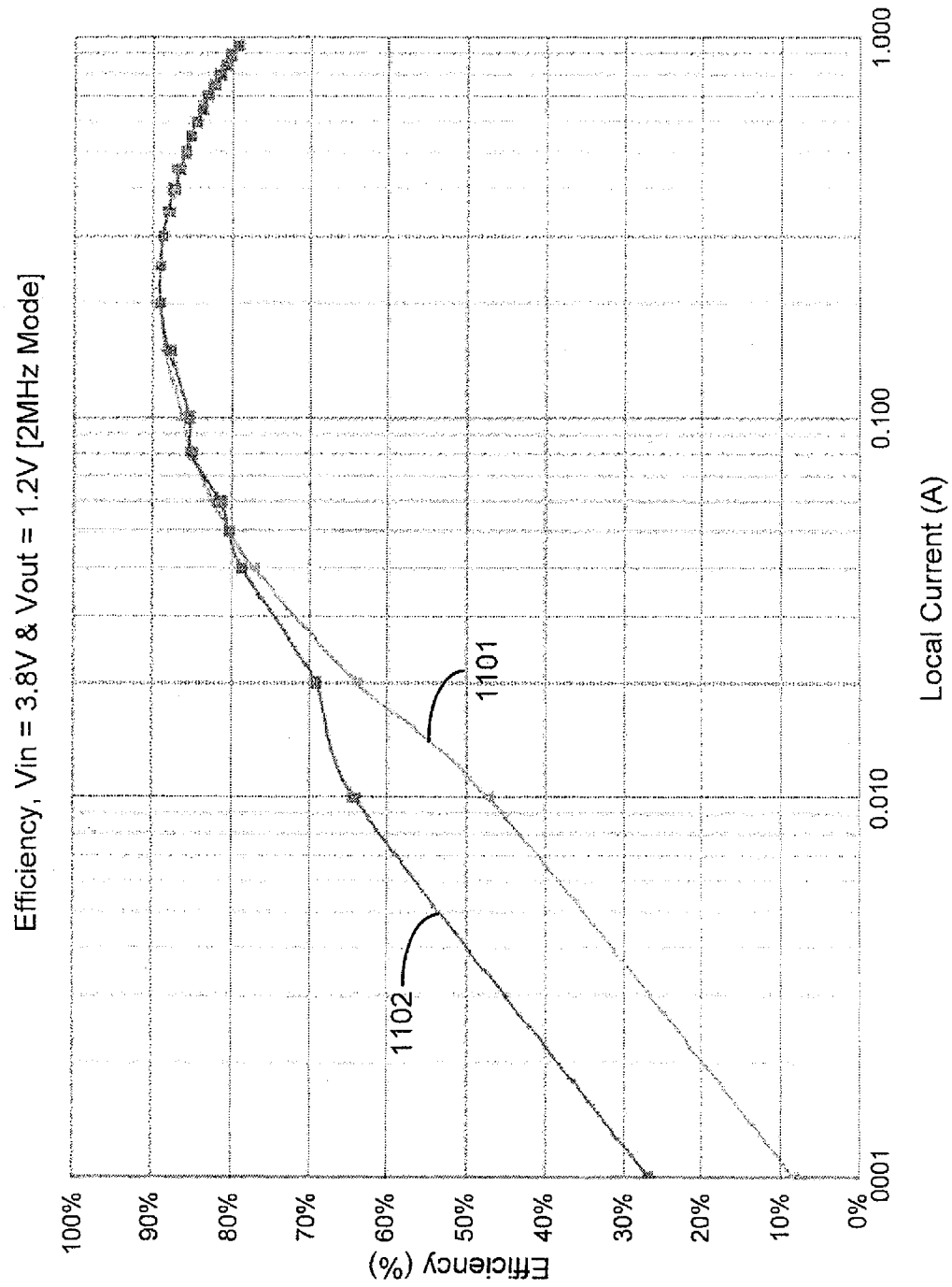
FIG. 11 illustrates the relative efficiency of operating a DC-DC in modes according to embodiments of the invention as compared to Forced CCM.

The skilled person will appreciate that CCM mode control offers the most stable control method but the other modes of operation offer efficiency savings. FIG. 11 illustrates the relative efficiency of a DC-DC converter operating purely in CCM, a forced CCM mode (FCCM), with a converter that automatically operates switches to DCM, via the transitional phase, and then to pulse skip mode at increasing low current demands. The curves show efficiency against current on a logarithmic scale. The curves shown in FIG. 11 apply to identical converters where only the mode of operation is changed and assume a constant $Y_{IN}$ and a constant $V_{OUT}$ throughout the operating range.

The lower curve 1101 shows the efficiency of the converter operating in FCCM. At relatively high current loads, around 200-300 mA, the converter is very efficient. However as the load current falls the efficiency drops markedly, due partly to the fact that the NMOS will pass negative current for a part of each cycle.

The upper curve 1102 shows operation of a converter with automatic mode switching enabled. At currents of 200 mA or above the converter is operating in CCM mode and hence the efficiency is effectively the same as for a converter operating in FCCM. Below 200 mA the transitional phase through to DCM proper is starting and the curves start to deviate with the converter operating in DCM being more efficient. Below about 20 mA in this example pulse skipping starts and there is a jump in efficiency as the switching losses are avoided. At lower currents still it can be seen that the converter operating in pulse skip mode is significantly more efficient than a corresponding converter operating in FCCM.

These significant efficiency saving can have a large impact on battery life for portable electronic device applications. However in some applications the efficiency gains may not be as much of a concern and it may be preferred to operate in FCCM to provide the best control over voltage ripple and the like. Conveniently therefore a mode control signal input to the duty controller, for example mode control signal 106 shown in FIG. 1, may determine whether the converter operates in FCCM or whether DCM and pulse skip modes of operation are enabled.

Various aspect and embodiments of the circuitry for implementing the modes described above will now be described.

FIG. 12 illustrates one embodiment of a current sensor according to this aspect of the present invention that has a Hold capability.

The N-channel current sensor 800 interface to the power switch 20 is shown.

A reference voltage $V_A$ is generated on the non-inverting input node of amplifier 805. $V_A$ is proportional to the current 801 and the series combination of the resistances of NMOS devices 803 and 804. This bias voltage $V_A$ is replicated at the inverting input node of amplifier 805 by the action of feedback, ensuring that node B, the drain of device 810, is held at $V_A$.

In normal operation, switch 809 is closed and switches 807 and 808 are open, allowing a current path through devices 20, 809, 811, 810, 812, and 813. Since node B is held at a constant voltage the current through 809, 811, 810 is given by $(V_A-V(LX))/R_{SX}$ where $R_{SX}$ is R809+R811+R810, i.e. the sum of the resistances of these three devices. Thus as the inductor current varies, the current through the NMOS also varies (the current through R809 is small compared to that through NMOS 20 and inductor L), so the voltage on LX varies due to the varying I.R drop across NMOS 20. This variation modulates the voltage across Rsx. Since Rsx is also a MOS channel resistance which will to first order track proportionately that of NMOS 20, the net result is a modulation in current through Rsx through 812 to the output that is independent of MOS channel resistance and is a pure ratioed copy of the current through NMOS 20, with ratio dependent mainly on the respective aspect ratios of the transistors involved.

Normally the current in the inductor is towards the load, as shown. This pulls the NMOS drain node LX below ground and increases the current through 809. However in some modes or during transients, the current may be of opposite polarity. Ignoring current source 802, the maximum reverse current detectable would be that causing LX to rise to a voltage $V_A$, i.e. $V_A/R20$ since 812 can only source, and not sink, current. Including current source 802 reduces this maximum reverse current.

When the current sensor is in track mode, i.e. when the NMOS is on and the actual current through the NMOS is being monitored, switch 815 is closed, and the current seen at node ISNS is created by the current mirror comprising devices 813, 814, and 815. When in Hold mode, as determined by the HOLD control signal (which is inverted for control of switch 815), the gate of mirror device 814 is open-circuited, and the gate stays at constant voltage, and hence its output current remains at the same value until reconnected. Known techniques, such as half-size devices clocked in anti-phase for example, are used to cancel the charge injection onto this gate node that would be caused by this switch turning off. Extra capacitance between gate and supply may be added, though proved to be unnecessary in this design as a gradual droop over time has little effect on the regulator output.

To obtain an accurate scaling value for ISNS versus absolute externally applied current, the current mirror 813, 814, and 815 may be made a digitally programmable current mirror composed of multiple elements to give a programmable current transfer ratio by standard techniques. In manufacture, a predetermined external current may be applied and the voltage developed across an internal on-chip resistor may be monitored and the current transfer ratio modified until a predetermined target voltage is developed across the on-chip resistor. This then fixes the regulator's "sense resistance" (strictly a transresistance) $R_{SENSE}$ to a known value relative to other on-chip resistances, enabling a tight tolerance of the loop transfer function. There will still be some variation due to other on-chip resistances/capacitances over temperature, but manufacturing variations in the short channel NMOS transistor resistance and offsets and current ratio errors in the Sensor Amp can be compensated.

The currents of devices 801 and 802 are inversely proportional to on-chip resistances similar to those used in the duty modulator block. Devices 803, 804, 810, 811, and switches 807, 808, and 809 are all scaled analogues of the resistance of the master power switch 20 in that they track each other over process, voltage supply, and temperature. That is the devices and switches are formed in the same area of the silicon so that any process variations affect all devices equally and the devices experience the same temperature and supply variations.

At the start of a period of duty cycle control, the current output of this current sensor should be reset to a value higher than that seen under normal conditions in order to prevent false triggering by the duty modulator block 900 of FIG. 5. This reset path is achieved by closing switch 807 while keeping switches 808 and 809 open. This decouples the sensor from the power device 20 and, by virtue of the series combination of devices 810 and 807 being less than the series combination of devices 810, 811, and 809, pushes the output current much higher than usual.

In order to save power, during some phases in DCM and pulse-skip modes, the path comprising devices 808, 810, 811, 812, and 813 is engaged which sets the ISNS output to the pedestal value seen during normal operation, rather than the higher reset value. This is achieved because the resistances of devices 808 and 809 are equal.

During CCM, switch 815 is closed. When the DC-DC converter is placed into the transitional mode between CCM and DCM, once zero current has been detected—actually always above zero, i.e. at Iped, to allow for offsets and propagation delays in the drive train—switch 815 is opened and the current produced on the ISNS output is held constant by the gate capacitance of device 814 at a level similar to that flowing just before the switch was opened.

FIG. 13 illustrates one embodiment of a ramp generator 500 which is capable of producing a slope compensation signal which may include a component emulating the change in inductor current.

It is apparent that the output current of the block is given by:

$$Iout(t) \equiv I_{512} + \frac{I_{507}}{M} - \frac{R_{504}}{R_{505} * M} * I_{506} - \frac{I_{506} + I_{503}}{M * C_{502} * R_{505}} * t$$

If the currents $I_{503}$, $I_{506}$, $I_{507}$, and $I_{512}$ are ratiometric with an external current reference, the added voltage contribution seen at the output node due to the ramp generator block is a fixed voltage offset that is dependent on the manufacturing tolerance of the on-chip resistors plus a time dependent ramp voltage independent of manufacturing tolerance in the on-chip resistors. The voltage offset may be reduced to zero to avoid dependence on on-chip resistance and to set the ramp to zero at the start of each cycle by judicious scaling of $R_{504}$, $R_{505}$, and M. The current source 503 may be controlled to change the slope of ramp to include the emulated change in inductor current when the NMOS is off and the body diode is conducting.

FIG. 14 shows a greatly simplified depiction of the duty modulator block with relevant connections as used in FIG. 5.

It consists of a bandgap voltage generator and internal resistor derived current source, 601, a voltage comparator, 602, two resistors, 603 and 604, and a mode control block, 605.

Mode control block comprises logic for generating a HOLD signal when signal ILIM_ZC goes true and keeping the hold signal high until reset—when the summing node voltage reaches $V_{ERROR}$ as described above with reference to FIGS. 10a and 10b. It also comprises logic for generating an EMULATE signal when ILIM_ZC goes true until NDIODE_OFF goes true.

Mode control block may also receive an external mode control signal for switching between FCCM mode or automatic DCM and pulse skipping. When operating in FCCM the signal ILIM_ZC may simply be kept continually false and the converter will only switch the NMOS off when the signal on the summing node reaches $V_{ERROR}$. It may be preferable however to effectively deactivate NDiode detect block 750 and zero cross detect block 850 when operating in FCCM.

Whilst the above embodiments have been described in relation to a DC-DC buck converter the embodiments of the invention can be applied generally to switching regulators. The switching regulator may be part of a power management apparatus such as a power management integrated circuit (i.e. a PMIC). The embodiments of the invention may be useful for power management of any sub-systems of any form of electrical device, whether having a single power source or multiple power sources and whether portable or not. The embodiments of the present invention are particularly applicable to portable devices however such as: mobile computing devices such as laptops, netbooks, PDAs and the like; mobile communication devices such as radio telephones, cellular telephone, mobile email devices and the like; personal media players such as MP3 or other audio players, personal radios, video players; portable video game consoles and devices; personal navigation devices such as satellite navigators and GPS receivers, whether in-vehicle or hand-held or any other portable or battery operated device.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

What is claimed is:

1. A DC-DC converter comprising:
    an inductor operably connected between a first node and an output node;
    a high side switch operably connected between a high side supply input node and the first node;
    a low side switch operably connected between a low side supply input node and the first node;
    switch control circuitry operable to control the turn on of said high side switch based on a comparison of at least a first signal indicative of the current flow in the inductor with a second signal indicative of a difference between the voltage at the output node and a target voltage;
    said switch control circuitry being operable such that said low side switch may be turned off before said comparison indicates that the high side switch should be turned on;
    wherein the switch control circuitry comprises emulation circuitry for emulating the change in inductor current during a period when both the high side and low side switches are turned off.

2. A DC-DC converter as claimed in claim 1 wherein the switch control circuitry comprises current sense circuitry for determining the current flow in the inductor from the electrical properties of the low side switch when the low side switch is turned on and wherein the output of said current sense circuit comprises the first signal when the low side switch is turned on.

3. A DC-DC converter as claimed in claim 2 wherein the electrical properties of the low side switch comprise a source-drain voltage of a transistor.

4. A DC-DC converter as claimed in claim 1 wherein the switch control circuitry comprises threshold monitoring circuitry for determining the current flow in the inductor from the electrical properties of the low side switch when the low side switch is turned on and monitoring current flow in the inductor against a threshold and wherein the switch control circuitry is arranged to turn the low side power switch off when the threshold is reached.

5. A DC-DC converter as claimed in claim 4 wherein said threshold is set such that the low side switch is turned off before the current flow through in the inductor reverses direction.

6. A DC-DC converter as claimed in claim 5 wherein the threshold level is varied in response to a variation of the target output voltage.

7. A DC-DC converter as claimed in claim 1 wherein the emulation circuitry comprises a hold circuit for holding a value of the current flow in the inductor before the low side switch turned off.

8. A DC-DC converter as claimed in claim 1 wherein the emulation circuitry comprises circuitry for generating a first ramp signal and means for applying the first ramp signal to at least one of the first signal and the second signal when the low side switch is turned off.

9. A DC-DC converter as claimed in claim 8 comprising a slope compensation circuit for applying a slope compensation ramp signal to at least one of the first and second signals prior to comparison and wherein the first ramp signal is applied to the slope compensation ramp signal.

10. A DC-DC converter as claimed in claim 9 wherein the slope compensation ramp circuitry comprises the circuitry for generating a first ramp signal and is configured to generate an output signal with a first slope corresponding to a slope compensation ramp signal or a second slope corresponding to a slope compensation signal combined with the first ramp signal.

11. A DC-DC converter as claimed in claim 8 wherein the first ramp signal has a slope substantially equal to $(V_{OUT}+\Phi)/L$ where $V_{OUT}$ is the output voltage of the inductor, $\Phi$ is a voltage drop associated with a parallel current path when the low side switch is off, and L is the inductance of the inductor.

12. A DC-DC converter as claimed in claim 11 wherein $\Phi$ is a diode voltage.

13. A DC-DC converter as claimed in claim 8 wherein the first ramp signal has a slope substantially equal to $(V_{OUT})/L$ where $V_{OUT}$ is the output voltage of the inductor and L is the inductance of the inductor.

14. A DC-DC converter as claimed in claim 8 wherein the circuitry for generating the first ramp signal is configured to stop applying the first ramp signal to the first or second signals when the inductor current is substantially zero.

15. A DC-DC converter as claimed in claim 1 comprising circuitry for detecting when the first node crosses a voltage threshold after the low side switch is turned off.

16. A DC-DC converter as claimed in claim 1 wherein the switch control circuitry is operable to prevent turning the high side switch on in a cycle if the period between turning the high side switch on and turning the high side switch off would be less than a first time period.

17. A DC-DC converter as claimed in claim 16 wherein the switch control circuitry comprises a first timer circuit for producing a first inhibit signal which inhibits turn on of the high side switch, for a time period substantially equal to the first time period, before a clock edge which would cause the high side switch to turn off.

18. A DC-DC converter as claimed in claim 17 wherein the first timer circuit comprises an input for receiving an input clock signal, a delay for producing a delayed clock signal and circuitry for generating the first inhibit signal based on the input clock signal.

19. A DC-DC converter as claimed in claim 1 wherein the switch control circuitry comprises a second timer circuit for determining the duration between a clock edge and the inductor current reaching zero and wherein the switch control circuitry is operable to prevent the low side switch from turning on in a subsequent cycle if said duration is less than a second time period.

20. A DC-DC converter as claimed in claim 19 wherein said subsequent cycle is the next cycle which follows a cycle in which the high side switch was turned on.

21. A DC-DC converter as claimed in claim 1 wherein the converter is operable in a first mode where the low side switch may be turned off prior to the high side switch turning on and a second mode where the low side switch may only be turned off when the high side switch is to be turned on.

22. A DC-DC converter as claimed in claim 1 wherein the cycle frequency of the converter is constant.

23. A power management integrated circuit comprising a DC-DC converter as claimed in claim 1.

24. An electronic device comprising a DC-DC converter as claimed in claim 1.

25. An electronic device as claimed in claim 24 wherein the device is one of a portable computing device; a laptop computer; a personal data assistant; a personal media player; an mp3 player; a portable television; a mobile communications device; a mobile telephone; a navigation aid; a GPS device; a game console.

* * * * *